(12) United States Patent
Choi

(10) Patent No.: US 10,739,897 B2
(45) Date of Patent: Aug. 11, 2020

(54) ELECTRONIC DEVICE AND OPERATING METHOD THEREOF

(71) Applicant: Samsung Electronics Co., Ltd, Gyeonggi-do (KR)

(72) Inventor: Seung-Min Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/448,536

(22) Filed: Mar. 2, 2017

(65) Prior Publication Data

US 2017/0255314 A1 Sep. 7, 2017

(30) Foreign Application Priority Data

Mar. 2, 2016 (KR) .................. 10-2016-0025102

(51) Int. Cl.
| | | |
|---|---|---|
| *G06F 3/041* | (2006.01) | |
| *G06F 3/16* | (2006.01) | |
| *G06F 1/16* | (2006.01) | |
| *G06F 3/0488* | (2013.01) | |
| *G06F 3/01* | (2006.01) | |
| *G06F 3/0484* | (2013.01) | |

(52) U.S. Cl.
CPC .......... *G06F 3/0414* (2013.01); *G06F 1/1626* (2013.01); *G06F 1/1684* (2013.01); *G06F 3/015* (2013.01); *G06F 3/0488* (2013.01); *G06F 3/04847* (2013.01); *G06F 3/165* (2013.01); *G06F 2203/04105* (2013.01)

(58) Field of Classification Search
CPC ...... G06F 3/0488; G06F 3/165; G06F 1/1626; G06F 1/1684; G06F 3/015; G06F 3/0414; G06F 3/04847; G06F 2203/04105
See application file for complete search history.

(56) References Cited

U.S. PATENT DOCUMENTS

| | | | |
|---|---|---|---|
| 7,633,300 B2 | 12/2009 | Keroe et al. | |
| 7,656,393 B2* | 2/2010 | King ...................... | G06F 1/1626 345/173 |
| 9,767,728 B2* | 9/2017 | Evans, V ............ | G02B 27/0093 |
| 9,798,409 B1* | 10/2017 | Wells ..................... | G06F 3/0414 |
| 2008/0297487 A1* | 12/2008 | Hotelling .............. | G06F 1/3203 345/173 |
| 2010/0137027 A1* | 6/2010 | Kim ..................... | G06F 3/03547 455/556.1 |
| 2012/0105358 A1* | 5/2012 | Momeyer ............. | G06F 3/0414 345/174 |
| 2014/0080416 A1* | 3/2014 | Seo ..................... | H04M 1/7253 455/41.2 |
| 2014/0253489 A1* | 9/2014 | Osoinach ............... | G06F 3/041 345/174 |
| 2015/0338988 A1* | 11/2015 | Lee ....................... | G06F 1/1613 345/173 |
| 2017/0046556 A1* | 2/2017 | Kim ..................... | G06F 3/04883 |

* cited by examiner

*Primary Examiner* — Bryan Earles

(57) ABSTRACT

A electronic device can include at least one sensor, a touch panel that is configured to be disposed to detect a touch corresponding to the sensor, a display, and a processor configured to identify an area where a touch is detected, identify a sensor corresponding to the area, control the display to display a user interface to control a function corresponding to the identified sensor; and control the function corresponding to the identified sensor. Other embodiments may be provided.

20 Claims, 45 Drawing Sheets

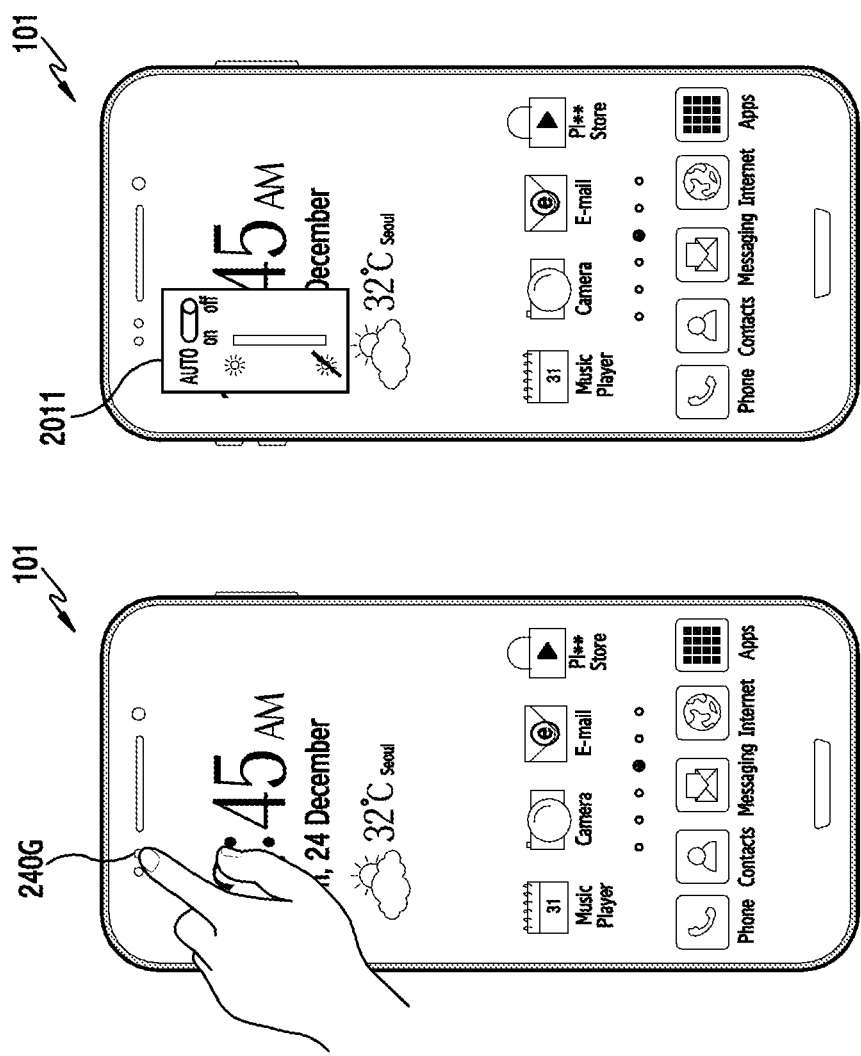

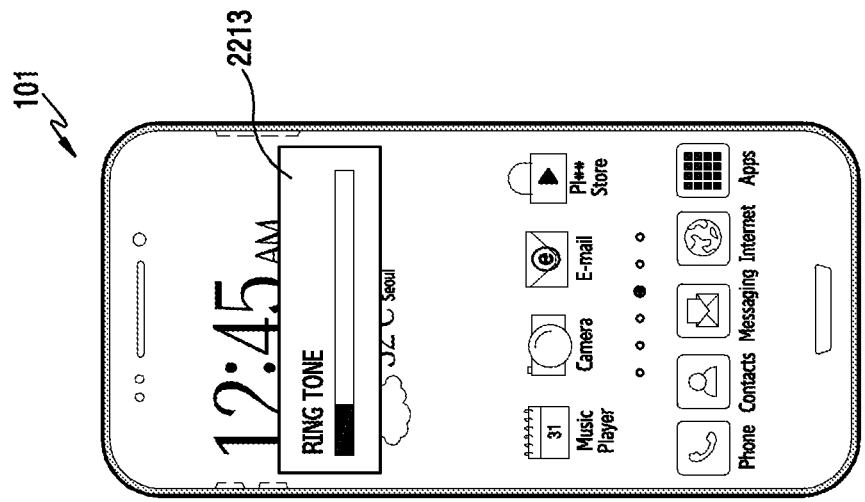
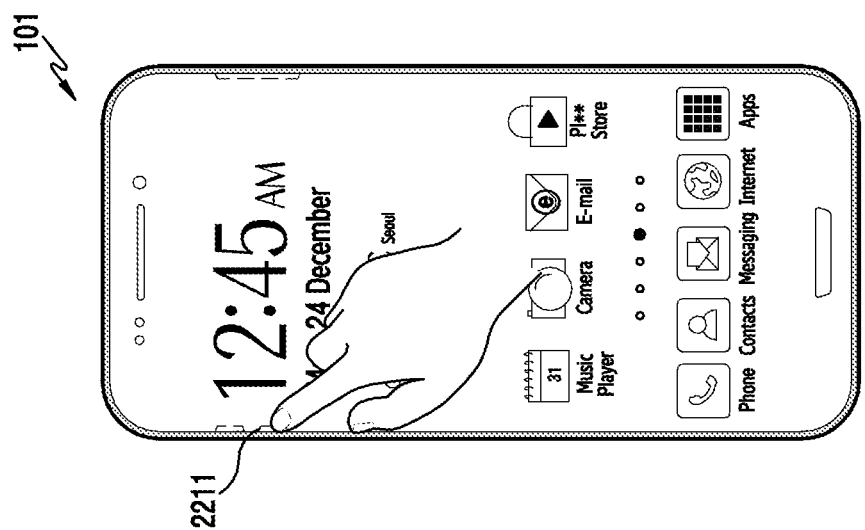
FIG.22A
FIG.22B

ELECTRONIC DEVICE AND OPERATING METHOD THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2016-0025102, which was filed in the Korean Intellectual Property Office on Mar. 2, 2016, the entire content of which is hereby incorporated by reference.

TECHNICAL FIELD

The present disclosure relates to an electronic device and an operating method thereof.

BACKGROUND

Generally, an electronic device executes complex functions by adding various functions. For example, the electronic device can execute a mobile communication function, a data communication function, an image photographing function, or a voice recording function. The electronic device can include a display for displaying data.

In addition, in order to control a variety of sensors (such as a camera sensor, an illuminance sensor, a proximity sensor, a biometric recognition sensor, or the like) provided in the electronic device, the user can enter a menu for controlling the respective sensors to then control the same. Therefore, user demand is growing for a method of more conveniently controlling the sensors.

SUMMARY

To address the above-discussed deficiencies, it is a primary object to can provide an electronic device that implements a display in which at least one surface of the electronic device is substantially extended to the entire surface thereof.

In addition, various embodiments provides an electronic device in which various sensors can be controlled by using a display even without entering a sensor control menu in order to control one or more sensors that are mounted in the electronic device.

An electronic device, according to an embodiment of the present disclosure, includes at least one sensor, a touch panel configured to be disposed to detect a touch corresponding to the at least one sensor, a display, and a processor, wherein the processor is configured to identify an area where a touch is detected, identify a sensor corresponding to the area, control the display to display a user interface to control a function corresponding to the identified sensor, and control the function corresponding to the identified sensor.

An operating method of an electronic device, according to an embodiment of the present disclosure, includes identifying a sensor corresponding to an area where a touch is detected among at least one sensor included in the electronic device, displaying a user interface to control a function corresponding to the identified sensor; and controlling the function corresponding to the identified sensor.

In various embodiments, it is possible to make an easy control of the sensor by using a display by touching the position of at least one sensor that is provided in the electronic device through a display in which at least one surface of the electronic device is substantially extended to the entire surface even without entering a sensor control menu.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 20A to 20B are example views of a screen showing an operating method of an electronic device, according to another embodiment of the present disclosure;

FIGS. 22A to 22B are example views of a screen showing an operating method of an electronic device, according to another embodiment of the present disclosure;

DETAILED DESCRIPTION

Figure 1:
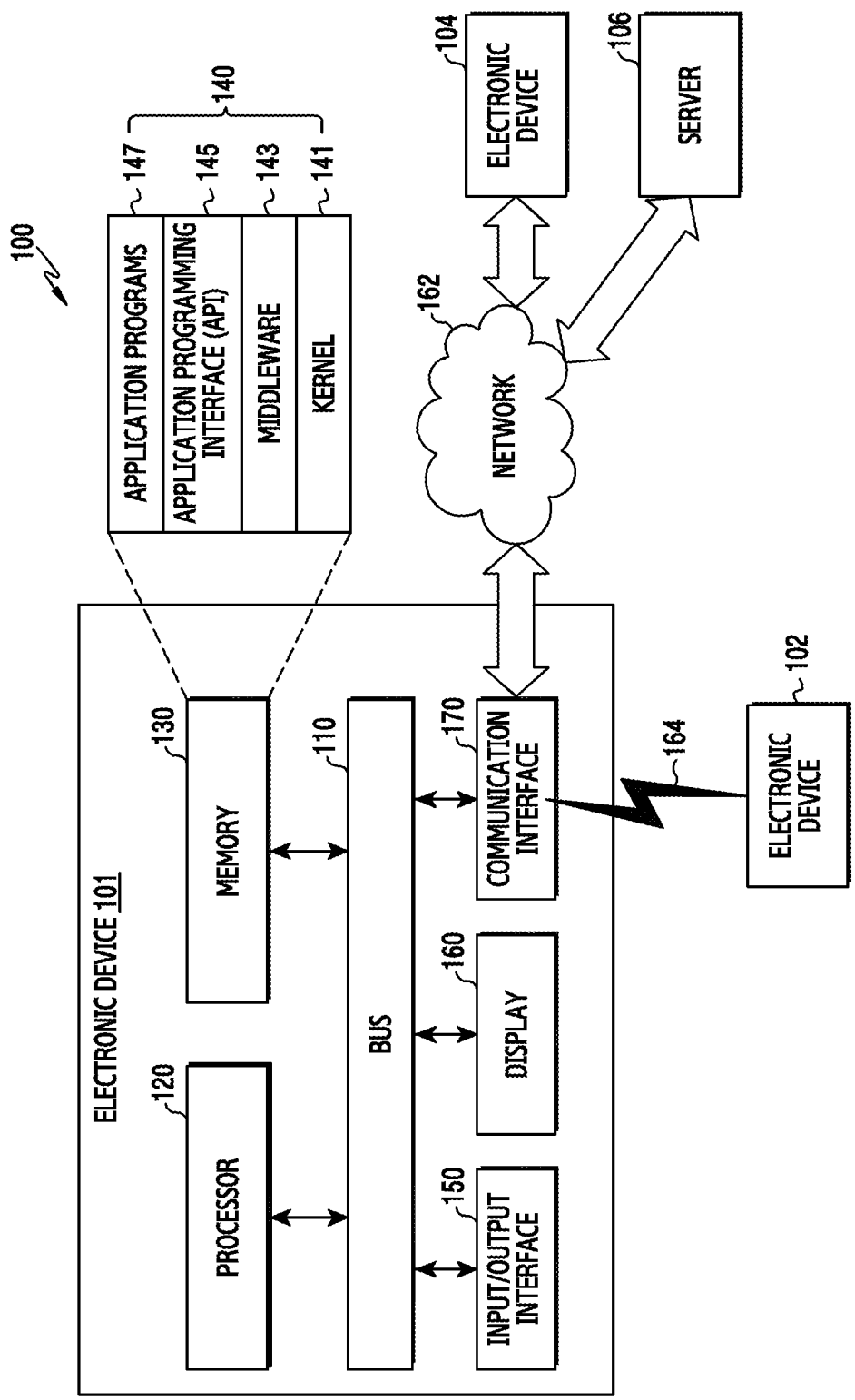
FIG. 1 is a view illustrating a network environment including an electronic device, according to an embodiment of the present disclosure.

FIGS. 1 through 25C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 can omit at least one of the above components or can further include other components.

The bus 110 can include, for example, a circuit which interconnects the components 110 to 170 and delivers a communication (e.g., a control message and/or data) between the components 110 to 170.

The processor 120 can include one or more of a Central Processing Unit (CPU), an Application Processor (AP), and a Communication Processor (CP). The processor 120 can carry out, for example, calculation or data processing relating to control and/or communication of at least one other component of the electronic device 101.

The memory 130 can include a volatile memory and/or a non-volatile memory. The memory 130 can store, for example, commands or data relevant to at least one other component of the electronic device 101. According to an embodiment of the present disclosure, the memory 130 can store software and/or a program 140. The program 140 can include, for example, a kernel 141, middleware 143, an Application Programming Interface (API) 145, and/or application programs (or "applications") 147. At least some of the kernel 141, the middleware 143, and the API 145 can be referred to as an Operating System (OS).

The kernel 141 can control or manage system resources (e.g., the bus 110, the processor 120, or the memory 130) used for performing an operation or function implemented in the other programs (e.g., the middleware 143, the API 145, or the application programs 147). Furthermore, the kernel 141 can provide an interface through which the middleware 143, the API 145, or the application programs 147 can access the individual components of the electronic device 101 to control or manage the system resources.

The middleware 143, for example, can serve as an intermediary for allowing the API 145 or the application programs 147 to communicate with the kernel 141 to exchange data.

Also, the middleware 143 can process one or more task requests received from the application programs 147 according to priorities thereof. For example, the middleware 143 can assign priorities for using the system resources (e.g., the bus 110, the processor 120, the memory 130, or the like) of the electronic device 101, to at least one of the application programs 147. For example, the middleware 143 can perform scheduling or loading balancing on the one or more task requests by processing the one or more task requests according to the priorities assigned thereto.

The API 145 is an interface through which the applications 147 control functions provided from the kernel 141 or the middleware 143, and can include, for example, at least one interface or function (e.g., instruction) for file control, window control, image processing, character control, and the like.

The input/output interface 150, for example, can function as an interface that can transfer commands or data input from a user or another external device to the other element(s) of the electronic device 101. Furthermore, the input/output interface 150 can output the commands or data received from the other element(s) of the electronic device 101 to the user or another external device.

Examples of the display 160 can include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 can display, for example, various types of contents (e.g., text, images, videos, icons, or symbols) to users. The display 160 can include a touch screen, and can receive, for example, a touch, gesture, proximity, or hovering input using an electronic pen or a user's body part.

The communication interface 170 can establish communication, for example, between the electronic device 101 and an external device (e.g., a first external electronic device 102, a second external electronic device 104, or a server 106). For example, the communication interface 170 can be connected to a network 162 through wireless or wired communication, and can communicate with an external device (e.g., the second external electronic device 104 or the server 106). The wireless communication can use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication can include, for example, short range communication 164. The short-range communication 164 can include at least one of, for example, Wi-Fi®, Bluetooth®, Near Field Communication (NFC), and Global Navigation Satellite System® (GNSS®). GNSS® can include, for example, at least one of global positioning system (GPS), global navigation satellite System® (Glonass®), Beidou Navigation satellite System® (Beidou®) or Galileo®, and the European global satellite-based navigation system, based on a location, a bandwidth, or the like. Hereinafter, in the present disclosure, the "GPS" can be interchangeably used with the GNSS®. The wired communication can include, for example, at least one of a Universal Serial Bus (USB), a High Definition Multimedia Interface (HDMI), Recommended Standard 232 (RS-232), and a Plain Old Telephone Service (POTS). The network 162 can include at least one of a telecommunication network such as a computer network (e.g., a LAN or a WAN), the Internet, and a telephone network.

Each of the first and second external electronic devices 102 and 104 can be of a type identical to or different from that of the electronic device 101. According to an embodiment of the present disclosure, the server 106 can include a group of one or more servers. According to various embodiments of the present disclosure, all or some of the operations performed in the electronic device 101 can be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 can request another device (e.g., the electronic device 102 or 104 or the server 106) to execute at least some functions relating thereto instead of or in addition to autonomously performing the functions or services. Another electronic device (e.g., the electronic device 102 or 104, or the server 106) can execute the requested functions or the additional functions, and can deliver a result of the execution to the electronic device 101. The electronic device 101 can process the received result as it is or additionally, and can provide the requested functions or services. To this end, for example, cloud computing, distributed computing, or client-server computing technologies can be used.

Figure 2:
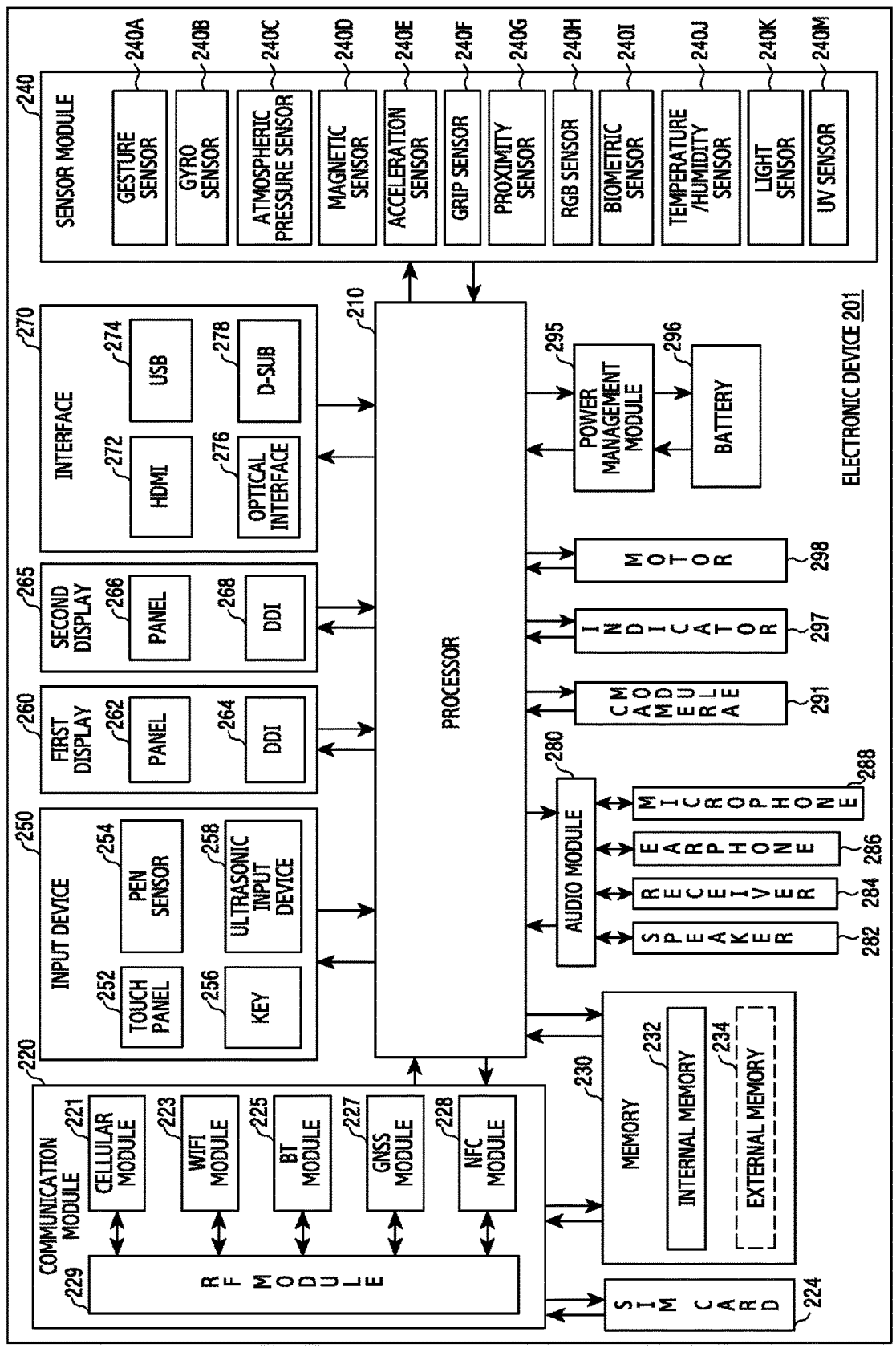
FIG. 2 is a block diagram illustrating the main configuration of an electronic device, according to an embodiment of the present disclosure.

FIG. 2 is a block diagram of an electronic device 201, according to various embodiments.

The electronic device 201, for example, can include all or some of the electronic device 101 shown in FIG. 1. The electronic device 201 can include one or more processors (for example, the AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210, for example, can control a multitude of hardware or software elements that are connected with the processor 210, and can perform the processing of a variety of data and a calculation by executing an operating system or application programs. The processor 210 can be implemented by, for example, a system on chip (SoC). According to an embodiment, the processor 210 can further include a graphic processing unit (GPU) and/or an image signal processor. The processor 210 can include at least some (for example, a cellular module 221) of the elements shown in FIG. 2. The processor 210 can load instructions or data received from one or more other elements (for example, a non-volatile memory) to a volatile memory to then process the same, and can store the result data thereof in a non-volatile memory.

According to various embodiments, the processor 210 (for example, the processor 120) can identify the occurrence of a touch on a touch panel 252. The processor 210 can identify the position in which the touch has occurred. The processor 210 can identify at least one of the equipped sensors that are provided in the electronic device 101, which corresponds to the identified position. To this end, the processor 210 can map coordinate values on the display 260 (for example, the display 160), which correspond to the positions of the equipped sensors that are provided in the electronic device 101, and can store the same in the memory 230 (for example, the memory 130). The processor 210 can map coordinate values with respect to the area in a threshold distance based on the coordinate value together to then store the same in the memory 230 when mapping the coordinate values corresponding to the positions of the equipped sensors on the display 160. The processor 210 can identify a coordinate value corresponding to the position in which a touch has occurred, and can control a specific sensor corresponding to the identified coordinate value. The processor 210 can display the current state of a specific sensor, and can display, on the display 160, a screen that is related to a function of the specific sensor. According to various embodiments, when a touch occurs on the touch panel 252, the processor 210 can identify the position in which the touch has occurred and a change in the pressure at the touch occurrence time. The processor 210 can identify a central point of the area where the touch is detected. The processor 210 can identify the position in which the touch has occurred based on the identified central point and the position in which a pressure change is the maximum. The processor 210 can control a specific sensor corresponding to the position in which the touch has occurred.

The communication module 220 can have the configuration that is identical or similar to the configuration of the communication interface 170. The communication module 220, for example, can include a cellular module 221, a WiFi module 223, a Bluetooth module 225, a GNSS module 227, an NFC module 228, and an RF module 229. The cellular module 221, for example, can provide services of voice calls, video calls, text messaging, or the Internet through communication networks. According to an embodiment, the cellular module 221 can perform identification and verification of the electronic device 201 in communication networks by using the subscriber identification module 224 (for example, the SIM card). According to an embodiment, the cellular module 221 can perform at least some of the functions that are provided by the processor 210. According to an embodiment, the cellular module 221 can include a communication processor (CP). According to a certain embodiment, at least some (for example, two or more) of the cellular module 221, the WiFi® module 223, the Bluetooth module 225, the GNSS® module 227, or the NFC module 228 can be included in one integrated chip (IC) or one IC package. The RF module 229, for example, can transmit and receive communication signals (for example, RF signals). The RF module 229, for example, can include a transceiver, a power amp module (PAM), a frequency filter, a low noise amplifier (LNA), an antenna, or the like. According to another embodiment, at least one of the cellular module 221, the WiFi® module 223, the Bluetooth module 225, the GNSS module 227, or the NFC module 228 can transmit and receive RF signals through a separate RF module. The subscriber identification module 224, for example, can include a card including a subscriber identification module or an embedded SIM card, and can include inherent identification information {for example, an integrated circuit card identifier (ICCID)} or subscriber information {for example, an international mobile subscriber identity (IMSI)}.

The memory 230 (for example, the memory 130), for example, can include an internal memory 232 or an external memory 234. The memory 230 can map a sensor provided in the electronic device 101 with a coordinate value corresponding to the position of the sensor on the display 160, and can store the same under the control of the processor 210. The internal memory 232, for example, can include at least one of volatile memories (for example, DRAM, SRAM, SDRAM, or the like) or non-volatile memories {for example, OTPROM (one time programmable ROM), PROM, EPROM, EEPROM, mask ROM, flash ROM, a flash memory, a hard drive, or a solid-state drive (SSD)}. The external memory 234 can include a flash drive {for example, CF (compact flash), SD (secure digital), Micro-SD, Mini-SD, xD (extreme digital), a multi-media card (MMC), a memory stick, or the like}. The external memory 234 can be functionally or physically connected with the electronic device 201 through various interfaces.

The sensor module 240, for example, can measure physical quantities or can detect an operation state of the electronic device 201 to then convert the measured or detected information to electric signals. The sensor module 240, for example, can include at least one of a gesture sensor 240A, a gyro-sensor 240B, an atmospheric pressure sensor 240C, a magnetic sensor 240D, an acceleration sensor 240E, a grip sensor 240F, a proximity sensor 240G, a color sensor 240H {for example, a red-green-blue (RGB) sensor}, a biometric sensor 240I, a temperature/humidity sensor 240J, an illuminance sensor 240K, an ultra violet (UV) sensor 240M, or a pressure sensor 240N. The biometric sensor 240I can include an iris sensor and/or a fingerprint sensor. Alternatively or additionally, the sensor module 240, for example, can include an E-nose sensor, an electromyography (EMG) sensor, an electroencephalogram (EEG) sensor, an electrocardiogram (ECG) sensor, and an infrared (IR) sensor. The sensor module 240 can further include a control circuit for controlling one or more sensors that are included therein. In a certain embodiment, the electronic device 201 can further include a processor as a part of, or separately from, the processor 210, which is configured to control the sensor module 240 in order to thereby control sensor module 240 while the processor 210 is in a sleep mode.

The input device 250, for example, can include a touch panel 252, a (digital) pen sensor 254, keys 256, or an ultrasonic input device 258. The touch panel 252, for example, can use at least one of a capacitive type, a pressure-sensitive type, an infrared type, or an ultrasonic type. The touch panel 252 can include one or more electrode layers, and one or more electrode layers can be directly formed on the second directional surface of a transparent substrate or on the first directional surface of the display, or can be formed on a separate film to then be attached to the transparent substrate or display. For example, one or more electrodes of the touch panel 252 can be disposed inside the display. In this case, one or more electrodes can be disposed between an upper plate and a lower plate of the display, and can be disposed between electrodes that are configured to drive the display. Alternatively, one or more electrodes of the touch panel 252 can be integrally formed with a polarizing layer. In addition, the touch panel 252 can further include a control circuit. The touch panel 252 can further include a tactile layer in order to thereby provide the user with a tactile reaction. The (digital) pen sensor 254, for example, can be a part of the touch panel, or can include a separate recognition sheet. The keys 256, for example, can include physical buttons, optical keys, or a keypad. The ultrasonic input device 258 can detect an ultrasonic wave that is generated in an input instrument through a microphone (for example, a microphone 288) to then identify data corresponding to the detected ultrasonic wave.

In an embodiment, the display (for example, the display 160) can include a first display 260 or a second display 265. The first display can include a first panel 262 and a first display driver IC (DDI) 264 that is configured to control the first panel. The first panel 262 can have a plurality of pixels, and each pixel can include sub-pixels that display RGB of three primary lights. The sub-pixel can include one or more transistors, and can adjust the pixel and display colors according to the intensity of a voltage (or a current) applied to the transistor. The first display driver IC 264 can include a gate driver circuit unit that has an on/off function and controls gates of the sub-pixels (RGB) and a source driver circuit unit that regulates image signals of the sub-pixels (RGB) to make a color difference. The first display driver IC 264 can adjust the transistors of the sub-pixels of the first panel 262 in order to thereby provide a full screen. The first display driver IC can operate to receive first image data from the processor 210 and to allow the first panel 262 to display a video or image.

The second display 265 can include a second panel 266 and a second display driver IC (DDI) 268 that is configured to control the second panel 266. The panel 266 can have a plurality of pixels, and each pixel can include sub-pixels that display RGB of three primary lights. The sub-pixel can include one or more transistors, and can adjust pixels and display colors according to the intensity of a voltage (or a current) applied to the transistor. The display driver IC 268 can include a gate driver circuit unit that has an on/off function and controls gates of the sub-pixels (RGB) and a source driver circuit portion that regulates image signals of the sub-pixels (RGB) to make a color difference. The display driver IC 268 can adjust the transistors of the sub-pixels of the panel 266 in order to thereby provide a full screen. The second display driver IC can operate to receive, from the processor 210, second image data that is the same as, or different from, the first image data and to allow the second panel to display a video or image.

In various embodiments, at least one of the first panel 262 or the second panel 266, for example, can be implemented to be flat, flexible, or bendable. At least one of the first panel 262 or the second panel 266 can include one or more modules that include the touch panel 252 and/or a pen sensor 254.

The first and second displays 260 and 265 (for example, the display 160) can include other image output equipment (a hologram device or a projector) (not shown) and/or a control circuit for controlling the same.

In the embodiments that implement a device including a plurality of displays, at least some of the content (for example, image data, image data stream, or the like) that changes in various modules and devices of a terminal can be processed by using the processor 210. The processor can determine to output the changing content to at least one of the first display 260 or the second display 265. For example, the processor can control the first display 260 to output instructions that are received from the communication module 220, and can control the second display 265 to output instructions that are received from the sensor module 240. In another embodiment, the content that is output from the first display 260 can be switched into the screen of the second display 265 to then be displayed to be extended thereto, or the content that is output from the second display 265 can be switched into the screen of the first display 260 to then be displayed to be extended thereto.

The interface 270, for example, can include an HDMI 272, a UBS 274, an optical interface 276, or a D-subminiature (D-sub) 278. The interface 270, for example, can be included in the communication interface 170 shown in FIG. 1. Additionally or alternatively, the interface 270, for example, can include a mobile high-definition link (MHL) interface, an SD card/MMC (multi-media card) interface, or an IrDA (infrared data association) standard interface.

The audio module 280, for example, can convert a sound into an electric signal, and vice versa. For example, at least some elements of the audio module 280 can be included in the input/output interface 145 shown in FIG. 1. The audio module 280, for example, can process sound information that is input or output through a speaker 282, a receiver 284, earphones 286, or a microphone 288. The camera module 291, for example, is a device for photographing still and moving images, and, according to an embodiment, it can include one or more image sensors (for example, a front sensor or a rear sensor), lenses, an image signal processor (ISP), or a flash (for example, an LED, a xenon lamp, or the like). The power management module 295, for example, can manage power of the electronic device 201. According to an embodiment, the power management module 295 can include a PMIC (power management integrated circuit), a charger IC, or a battery or fuel gauge. The PMIC can have a wired charging type and/or a wireless charging type. The wireless charging type, for example, can encompass a magnetic resonance type, a magnetic induction type, or an electromagnetic wave type, and can further include additional circuits for wireless charging, such as coil loops, resonance circuits, rectifiers, or the like. The battery gauge, for example, can measure the remaining power of the battery 296, and a charging voltage, current, or temperature. The battery 296, for example, can include a rechargeable battery or a solar battery.

The indicator 297 can display a specific state (for example, a booting state, a message state, or a charging state) of the whole or a part (for example, the processor 210) of the electronic device 201. The motor 298 can convert an electric signal to a mechanical vibration, and can provide a vibration or haptic effect. The electronic device 201, for example, can include a mobile TV support device (for example, a GPU) for processing media data according to the standards, such as DMB (digital multimedia broadcasting), DVB (digital video broadcasting), or mediaFlo™. Each of the elements that have been described in the present specification can be configured with one or more sensors (components), and the name of the corresponding element can vary with the type of electronic device. In various embodiments, the electronic device (for example, the electronic device 201) can exclude some of the elements, or can include additional elements. Alternatively, some of the elements can be combined to configure a single entity that can execute the same function as the elements that are not combined.

Each of the above-described component elements of hardware according to the present disclosure can be configured with one or more components, and the names of the corresponding component elements can vary based on the type of electronic device. The electronic device according to various embodiments of the present disclosure can include at least one of the aforementioned elements. Some elements can be omitted or other additional elements can be further included in the electronic device. Also, some of the hardware components according to various embodiments can be combined into one entity, which can perform functions identical to those of the relevant components before the combination.

Figure 3:
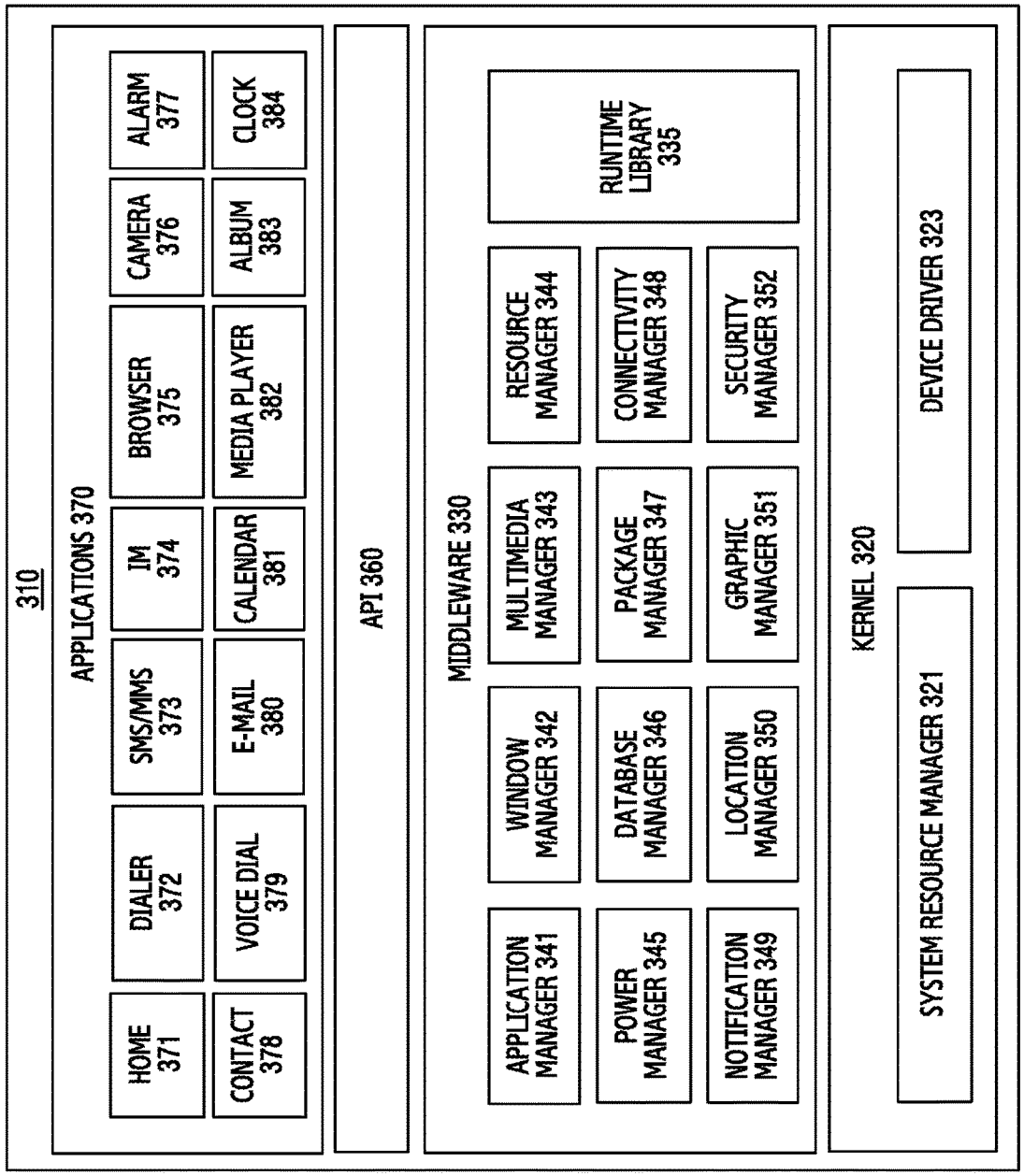
FIG. 3 is a block diagram illustrating a program module, according to an embodiment of the present disclosure.

FIG. 3 is a block diagram of a program module, according to various embodiments. According to an embodiment, the program module 310 (for example, the programs 140) can include an operating system (OS) for controlling resources that are related to the electronic device (for example, the electronic device 101) and/or various applications (for example, the application programs 147) that are operated under the operating system. For example, the operating system can be Android, iOS, Windows, Symbian, Tizen, Bada, or the like.

The program module 310 can include a kernel 320, middleware 330, an application programming interface (API) 360, and/or applications 370. At least some of the program module 310 can be preloaded in the electronic device, or can be downloaded from external electronic devices (for example, the electronic devices 102 and 104, or the server 106).

The kernel 320 (for example, the kernel 141), for example, can include a system resource manager 321 and/or a device driver 323. The system resource manager 321 can perform control, allocation, or collection of the system resources. According to an embodiment, the system resource manager 321 can include a process management unit, a memory management unit, or a file system management unit. The device driver 323, for example, can include a display driver, a camera driver, a Bluetooth driver, a shared memory driver, a USB driver, a keypad driver, a WiFi® driver, an audio driver, or an IPC (inter-process communication) driver.

As one of various embodiments, the display driver can control one or more display driver ICs (DDI). The display driver can include functions for controlling a screen according to requests of the applications 370.

The middleware 330, for example, can provide functions required in common for the applications 370, or can provide various functions to the applications 370 through the API 360 in order to allow the applications 370 to effectively use limited system resources in the electronic device. According to an embodiment, the middleware 330 (for example, the middleware 143) can include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run time library 335, for example, can include a library module that a compiler uses in order to add new functions through programming languages while the applications 370 are executed. The run time library 335 can perform the input/output management, the memory management, or a function of an arithmetic calculation.

The application manager 341, for example, can manage a life cycle of at least one of the applications 370. The window manager 342 can manage a GUI resource that is used in the screen. For example, in the case where two or more displays 260 are connected, the screen can be differently configured or managed according to a screen ratio or the operation of the applications 370. The multimedia manager 343 can identify formats for reproducing various media files, and can perform encoding or decoding of media files by using a codec that conforms to the corresponding format. The resource manager 344 can manage resources, such as source codes, memories, or storage spaces of one or more applications 370.

The power manager 345, for example, can manage a battery or power by operating in association with a basic input/output system (BIOS), and can provide power information that is necessary for the operation of the electronic device. The database manager 346 can create, retrieve, or change a database that is to be used in one or more applications 370. The package manager 347 can manage the installation or updating of the applications that are distributed in the form of a package file.

The connectivity manager 348, for example, can manage a wireless connection, such as WiFi or Bluetooth. The notification manager 349 can display or notify of events (such as received messages, appointments, or proximity notifications) to the user without disturbance. The location manager 350 can manage location information of the electronic device. The graphic manager 351 can manage graphic effects to be provided to the user or user interfaces related thereto. The security manager 352 can provide a general security function that is required for the system security or user verification. According to an embodiment, in the case of the electronic device (for example, the electronic device 101) adopting a phone call function, the middleware 330 can further include a telephony manager for managing the functions of a voice call or a video call of the electronic device.

The middleware 330 can include a middleware module that forms a combination of various functions of the above-described elements. The middleware 330 can provide a module that is specialized according to the type of operating system in order to provide differentiated functions. In addition, the middleware 330 can dynamically exclude some of the typical elements or add new elements.

The API 360 (for example, the API 145), for example, can be a group of API programming functions, and can be provided as a different configuration according to an operating system. For example, one set of APIs can be provided to each platform in the case of Android or iOS, and two or more sets of APIs can be provided to each platform in the case of Tizen.

The applications 370 (for example, the application programs 147), for example, can include one or more applications that can execute functions of home 371, a dialer 372, SMS/MMS 373, IM (instant message) 374, a browser 375, a camera 376, an alarm 377, contacts 378, voice dial 379, e-mail 380, a calendar 381, a media player 382, an album 383, a clock 384, healthcare (for example, measuring the amount of exercise or blood glucose), providing environment information (for example, providing atmospheric pressure, humidity, or temperature information), or the like.

According to an embodiment, the applications 370 can include an application (hereinafter, referred to as "information-exchange application" for the convenience of explanation) that supports the exchange of information between the electronic device (for example, the electronic device 101) and the external electronic device (for example, the electronic device 102 or 104). The information-exchange application, for example, can include a notification relay application for relaying specific information to the external electronic devices, or can include a device management application for managing the external electronic devices.

For example, the notification relay application can include a function of transferring notification information that is generated in other applications (for example, the SMS/MMS application, the e-mail application, the healthcare application, or the environment information application) of the electronic device to the external electronic device (for example, the electronic device 102 or 104). In addition, the notification relay application, for example, can receive notification information from the external electronic device to then provide the same to the user.

The device management application, for example, can manage (for example, install, delete, or update): one or more functions {for example, turning on and off the external electronic device (or some equipped sensors) or adjusting the brightness (or resolution) of a display} of the external electronic device (for example, the electronic device 102 or 104) that communicates with the electronic device; applications that are executed in the external electronic device; or services (for example, a phone call service or a messaging service) that are provided by the external electronic device.

According to an embodiment, the applications 370 can include applications (for example, the healthcare application of a mobile medical device) that are designated according to the attribute of the external electronic device (for example, the electronic device 102 or 104). According to an embodiment, the applications 370 can include applications that are received from the external electronic device (for example, the server 106 or the electronic device 102 or 104). According to an embodiment, the applications 370 can include preloaded applications or third party applications that can be downloaded from a server. The names of the elements of the program module 310, according to the illustrated embodiment, can vary depending on the type of operating system.

According to various embodiments, at least some of the program module 310 can be implemented by software, firmware, hardware, or a combination thereof. At least some of the program module 310, for example, can be implemented (for example, executed) by the processor (for example, the processor 120). At least some of the program module 310, for example, can include modules, program routines, sets of instructions, or processors for executing one or more functions.

The term "module" as used herein can, for example, mean a unit including one of hardware, software, and firmware or a combination of two or more of them. The "module" can be interchangeably used with, for example, the term "unit", "logic", "logical block", "component", or "circuit". The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure can be implemented by a command stored in a computer-readable storage medium in a programming module form. The instruction, when executed by a processor (e.g., the processor 120), can cause the one or more processors to execute the function corresponding to the instruction. The computer-readable storage medium can be, for example, the memory 130.

The computer readable recoding medium can include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

The programming module according to the present disclosure can include one or more of the aforementioned components or can further include other additional components, or some of the aforementioned components can be omitted. Operations executed by a module, a programming module, or other component elements according to various embodiments of the present disclosure can be executed sequentially, in parallel, repeatedly, or in a heuristic manner. Further, some operations can be executed according to another order or can be omitted, or other operations can be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
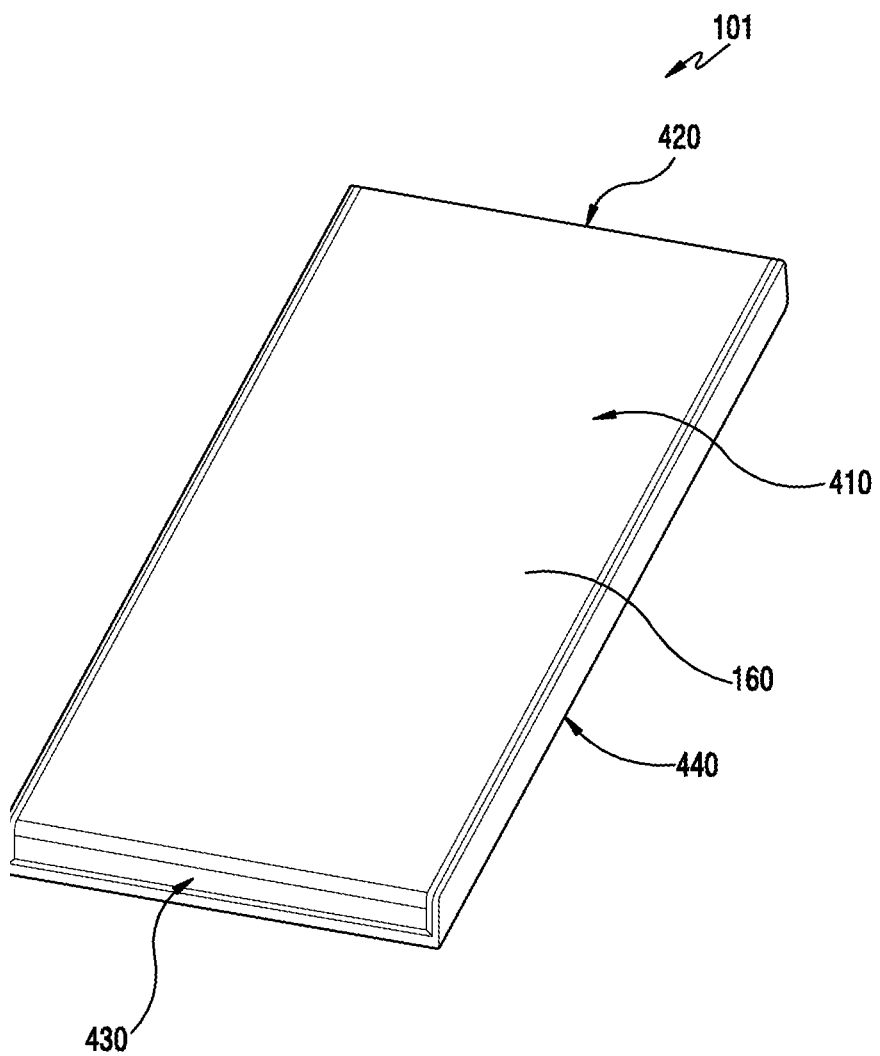
FIG. 4 illustrates a perspective view of an electronic device, according to an embodiment of the present disclosure.

FIG. 4 illustrates a perspective view of an electronic device, according to an embodiment of the present disclosure.

As shown in FIG. 4, the electronic device 101 can include a first surface 410, a second surface 420, a third surface 430, and a fourth surface 440. The first surface 410 can be the front surface of the electronic device 101. The second surface 420 or the third surface 430 can be a surface that is formed between the first surface 410 and the fourth surface 440. Although the second surface 420 and the third surface 430 are illustrated to be a lateral surface that has one shorter length in the electronic device 101 of FIG. 4, the embodiment is not limited thereto, and the second surface 420 and the third surface 430 can be a lateral surface that has one longer length. The fourth surface 440 can be the back surface of the electronic device 101. The display 160 can be disposed on at least one of the first surface 410, the second surface 420, the third surface 430, or the fourth surface 440 in the electronic device 101. According to an embodiment, the display 160 can be disposed on the first surface 410, the second surface 420, and the third surface 430 in the electronic device 101. A single display 160 can be disposed on the entire area of the first surface 410. The display 160 can be disposed on the entire area of the first surface 410 by omitting holes for instruments or physical buttons. The display 160 can be disposed to be extended from the first surface 410 to the second surface 420 and the third surface 430. According to an embodiment, one flexible display 160 can be bent in the second surface 420 and the third surface 430. According to one embodiment, the electronic device 101 can include a display 160 in the form in which a non-display area is not completely removed. For example, the electronic device 101 can include a BM area in which the width of a portion is 0.1 mm to 1 mm and the width of at least another portion is 1 mm to 5 mm in the non-display area.

Figure 5:
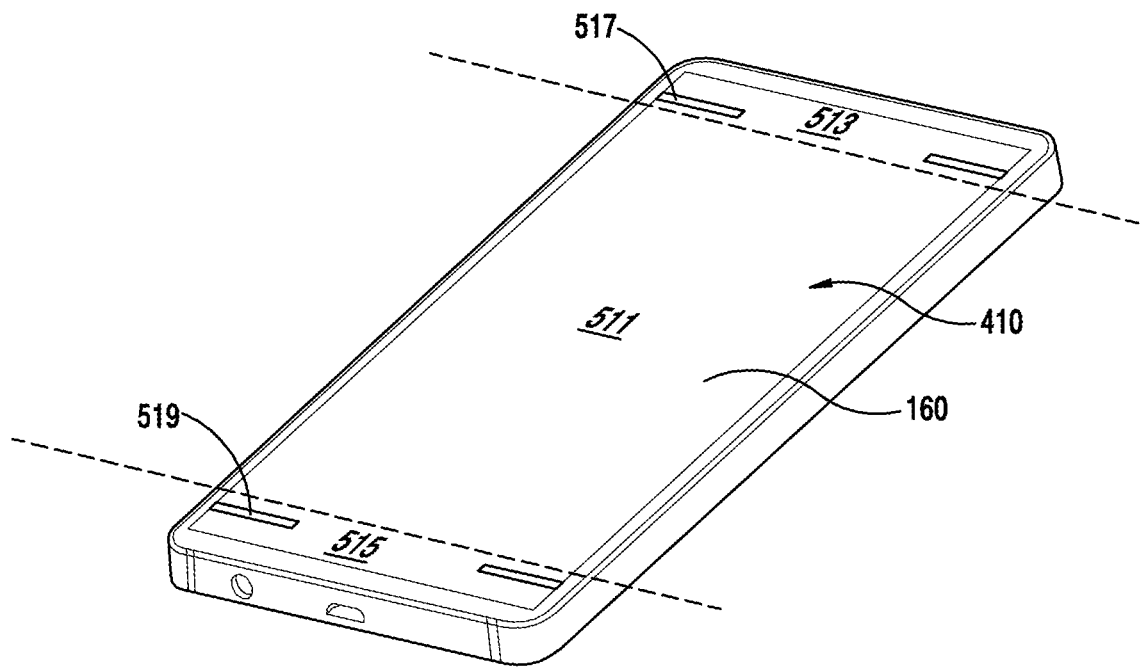
FIG. 5 illustrates a perspective view of an electronic device, according to another embodiment of the present disclosure.

FIG. 5 illustrates a perspective view of an electronic device, according to another embodiment of the present disclosure.

As shown in FIG. 5, the first surface 410 of the electronic device 101 can include a main area 511, a first sub-area 513, and a second sub-area 515. The main area 511 can be a main area of the first surface 410. The first sub-area 513 and the second sub-area 515 can be disposed in one side of the main area 511. The first sub-area 513 and the second sub-area 515 can be disposed in the upper portion and lower portion of the main area 511, respectively. The display 160 can be disposed in the main area 511, the first sub-area 513 and the second sub-area 515. The display 160 can include a first discontinuity area 517 in which the area is, at least in part, discontinuous between the main area 511 and the first sub-area 513. The display 160 can include a second discontinuity area 519 in which the area is, at least in part, discontinuous between the main area 511 and the second sub-area 515. The first discontinuity area 517 and the second discontinuity area 519 can be formed by adding a non-conductive member to the display 160. Alternatively, the first discontinuity area 517 and the second discontinuity area 519 can be formed by removing a portion of the display 160. The performance of the antenna or various sensors can be secured through the first discontinuity area 517 and the second discontinuity area 519 in the electronic device 101. For example, the first discontinuity area 517 and the second discontinuity area 519 can be used as an individual antenna radiator, respectively, by configuring a power supply portion to each of the same.

Figure 6:
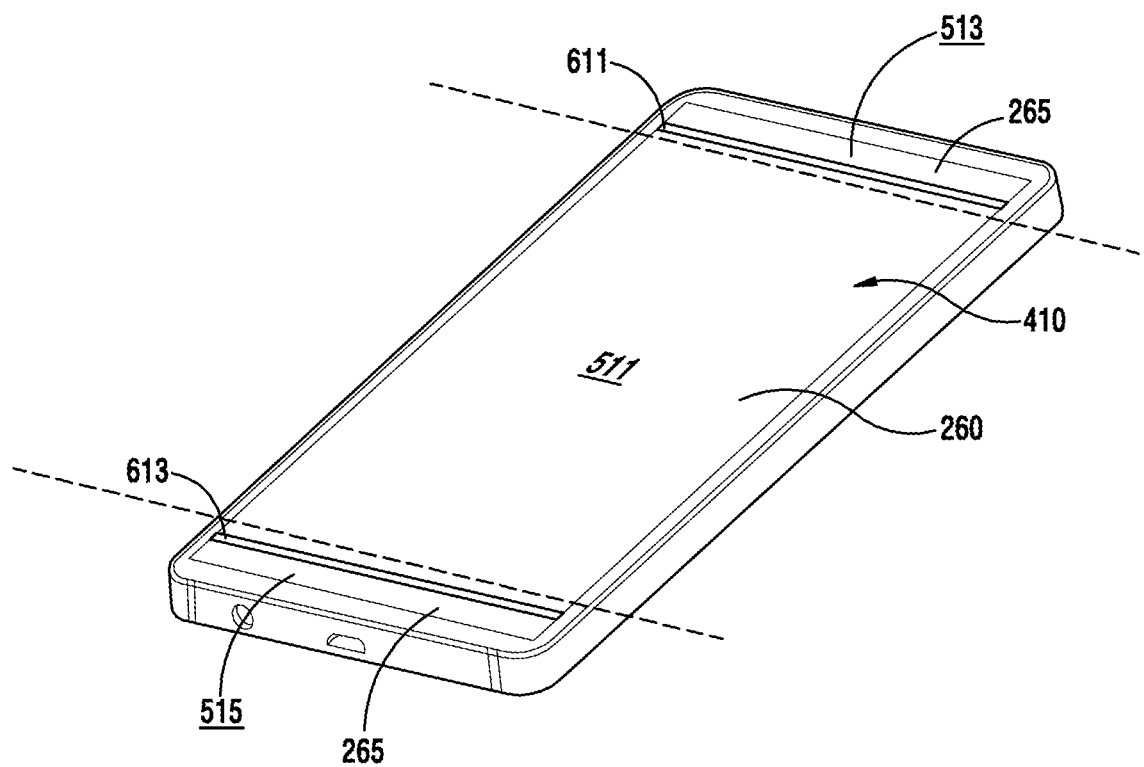
FIG. 6 illustrates a perspective view of an electronic device, according to another embodiment of the present disclosure.

FIG. 6 illustrates a perspective view of an electronic device, according to another embodiment of the present disclosure.

As shown in FIG. 6, the electronic device 101 can include a first display 260 and a second display 265. The first surface 410 of the electronic device 101 can include a main area 511, a first sub-area 513, a second sub-area 515, a third sub-area 611, and a fourth sub-area 613. The first sub-area 513 and the second sub-area 515 can be disposed in one side of the main area 511. The first sub-area 513 and the second sub-area 515 can be disposed in the upper portion and in the lower portion of the main area 511, respectively. The first display 260 can be disposed in the main area 511. The second display 265 can be disposed in the first sub-area 513 and the second sub-area 515, respectively. The third sub-area 611 and the fourth sub-area 613 can be provided between the first display 260 and second display 265, respectively. The first display 260 and the second display 265 can be separated from each other by the third sub-area 611 and the fourth sub-area 613. According to an embodiment, a conductive member of the second display 265 can be utilized as an antenna radiator. For example, the conductive member of the second display 265 can be utilized as an antenna radiator by adding a non-conductive member to the third sub-area 611 and the fourth sub-area 613 and by adding a power supply portion to the second display 265.

Figure 7A:
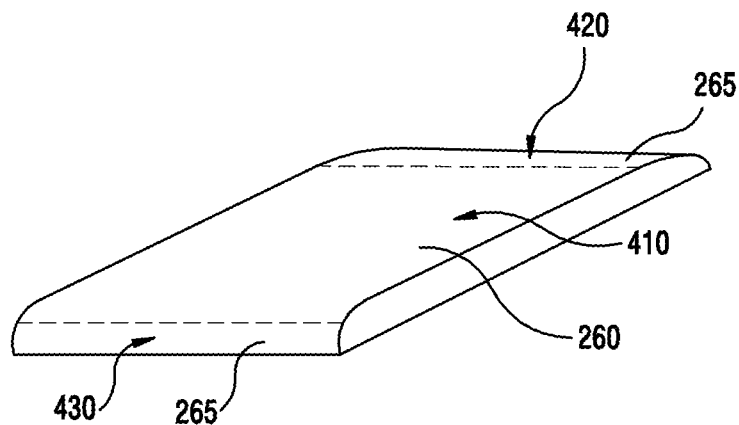
FIGS. 7A to 7B illustrate perspective views of an electronic device, according to another embodiment of the present disclosure.
Figure 7B:
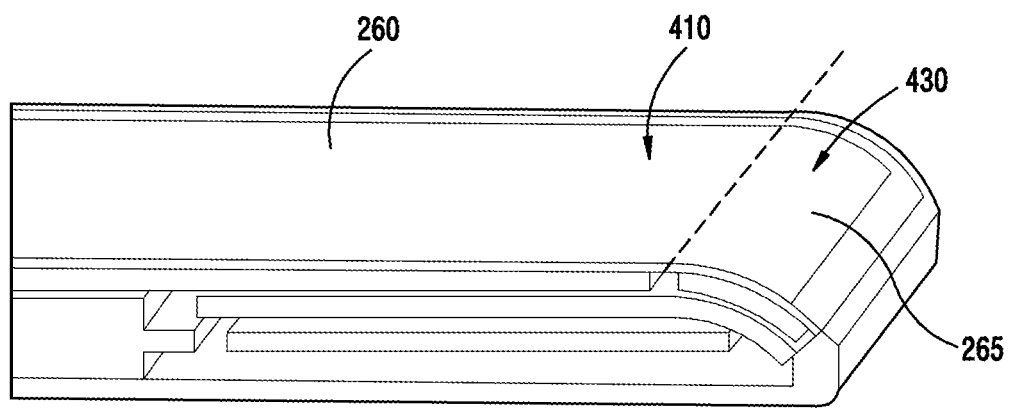

FIGS. 7A to 7B illustrate perspective views of an electronic device, according to another embodiment of the present disclosure.

As shown in FIGS. 7A to 7B, the electronic device 101 can include a first display 260 and a second display 265. The first display 260 can be disposed on the first surface 410. The second display 265 can be disposed on at least one of the second surface 420 or the third surface 430. According to various embodiments, at least one of the second surface 420 or the third surface 430 can be a curved surface. Therefore, the first display 260 and second display 265 can be naturally disposed along the curved surface. According to various embodiments, a conductive member of the second display 265 can be utilized as an antenna. Alternatively, an additional conductive member can be configured on the second display 265 to then be utilized as an antenna. For example, various conductive films {such as an ITO (indium tin oxide) film} can be disposed on the second display 265 to then be utilized as an antenna.

Figure 8:
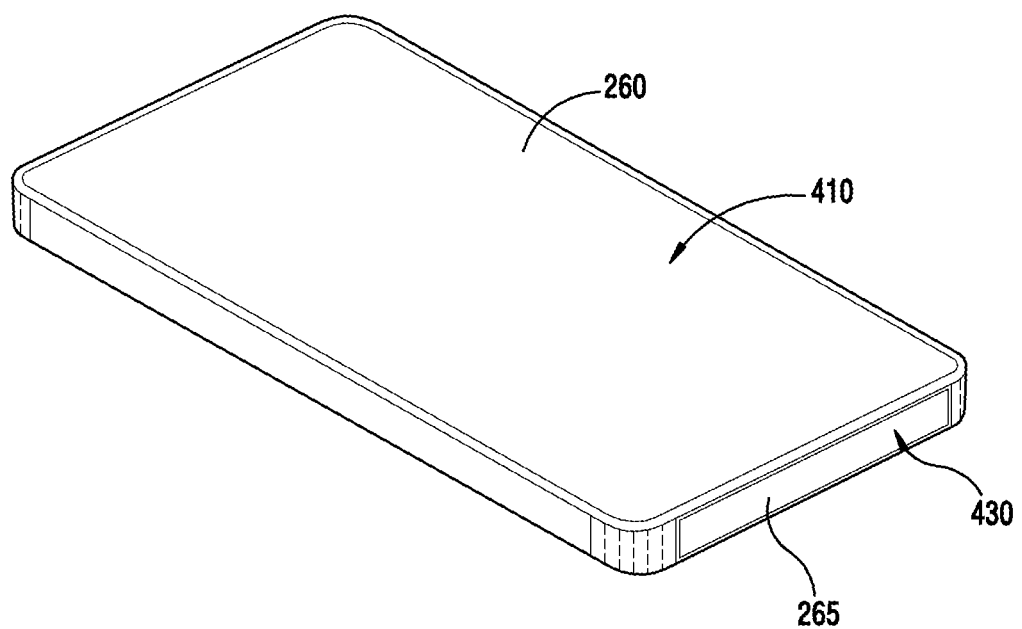
FIG. 8 illustrates a perspective view of an electronic device, according to another embodiment of the present disclosure.

FIG. 8 illustrates a perspective view of an electronic device, according to another embodiment of the present disclosure.

As shown in FIG. 8, the electronic device 101 can include a first display 260 and a second display 265. The first display 260 can be disposed on the first surface 410. The second display 265 can be disposed on at least one of the second surface 420 or the third surface 430. According to various embodiments, the first display 260 and the second display 265 can be clearly separated by separately providing the second display 265 to at least one of the second surface 420 or the third surface 430.

Figure 9:
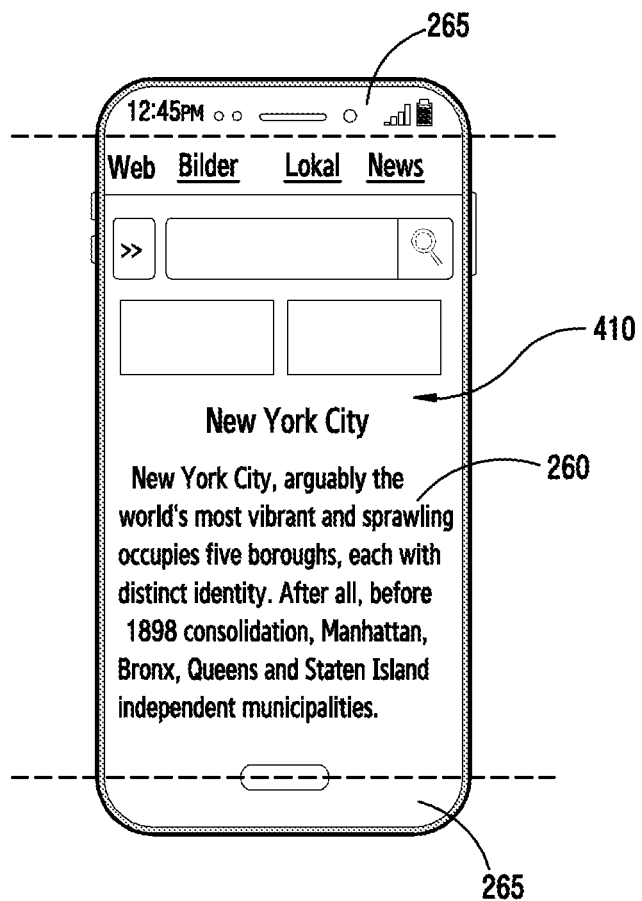
FIG. 9 is an example view of a screen of an electronic device, according to an embodiment of the present disclosure.

FIG. 9 is an example view of a screen of an electronic device, according to an embodiment of the present disclosure.

As shown in FIG. 9, the first display 260 and one or more second displays 265 can be disposed on the first surface 410. A screen can be displayed on the first display 260 and the second display 265. For example, a single screen can be displayed to be divided on the first display 260 and second display 265. That is, the screen that is displayed on the first display 260 and the screen that is displayed on the second display 265 can constitute a single screen. Alternatively, the screens that are displayed on the first display 260 and the second display 265 can be different. The first display 260 and the second display 265 can display a home key. A home key screen that looks like a physical button can be displayed on the first display 260 and the second display 265, instead of the physical button. The first display 260 and the second display 265 can display a home key, and a fingerprint sensor (for example, the biometric sensors 240I) can be provided in the area where the home key is displayed. Although FIG. 9 shows that the first display 260 and the second display 265 are disposed on the first surface 410, the embodiments are not limited thereto. Therefore, as described in FIG. 4 above, a single display 160 can be disposed in the entire area of the first surface 410.

Figure 10:
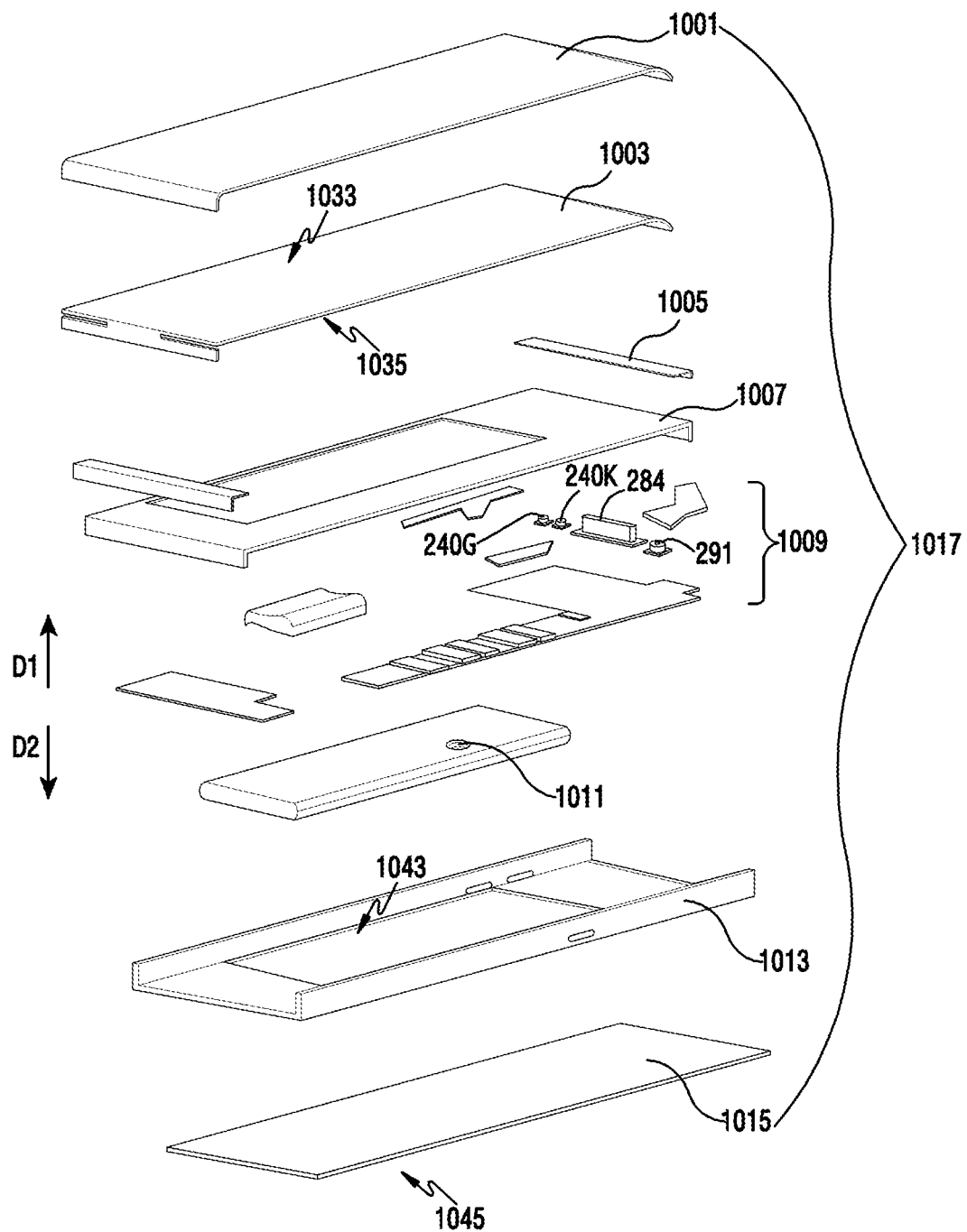
FIG. 10 illustrates an exploded perspective view of an electronic device, according to an embodiment of the present disclosure.

FIG. 10 illustrates an exploded perspective view of an electronic device, according to an embodiment of the present disclosure.

As shown in FIG. 10, the electronic device 101 can include a transparent plate 1001, a display 1003, a flexible printed circuit board (FPCB) 1005, a bracket 1007, a panel board assembly (PBA) 1009, a battery 1011, and a housing 1017. The electronic device 101 can include a proximity sensor 240G, an illuminance sensor 240K, a receiver 284, and a camera 291 (for example, the camera module 291).

The transparent plate 1001 can be disposed in the upper portion of the electronic device 101. The transparent plate 1001 can protect a variety of elements that are disposed under the same. The transparent plate 1001 can allow an internal light that is emitted from the inside of the electronic device 101 to pass through the same to the outside. In addition, the transparent plate 1001 can allow an external light that is incident from the outside of the electronic device 101 to pass through the same to the inside. The transparent plate 1001 can be formed of a material that has a good light transmittance, heat resistance, chemical resistance, and mechanical strength. Here, the transparent plate 1001, for example, can be a transparent film made of polyethylene terephthalate or the like or glass substrate, or can be a plastic substrate that is made of polymethyl methacrylate, polyamide, polyimide, polypropylene, or polyurethane.

According to various embodiments, the transparent plate 1001 can further include a touch panel 252 that is able to detect a touch that occurs on the surface. The touch panel 252 can correspond to the touch panel 252 that has been described in FIG. 2. The touch panel 252, for example, can detect a touch by using at least one of a capacitive type, pressure-sensitive type, an infrared type, or an ultrasonic type.

Meanwhile, the transparent plate 1001 is provided in the upper portion of the electronic device 101 to protect the internal elements, and can constitute a part of the housing 1017.

The housing 1017 can include a first surface 1043 and a second surface 1045. The first surface 1043 can be directed in the first direction (D1). The second surface 1045 can be directed in the second direction (D2), which is the opposite direction of the first direction (D1). The transparent plate 1001 can form at least a part of the first surface 1043 of the housing 1017. That is, the transparent plate 1001 can form a part of the housing 1017.

The display 1003 can be an element that corresponds to the display 160 that has been described in FIG. 1 above. The display 1003 can be disposed between the transparent plate 1001 and the second surface 1045 of the housing 1017. The display 1003 can include a first surface 1033 that is directed in the first direction (D1) and a second surface 1035 that is directed in the second direction (D2). The display 1003 is an internal element of the electronic device 101, which can perform a practical operation in the electronic device 101. The display 1003 can execute a function of displaying an image.

The flexible printed circuit board 1005 can be electrically connected to various elements including the display 1003. The flexible printed circuit board 1005 can apply or receive signals to or from the display 1003. The bracket 1007 can fix the panel board assembly 1009 and the battery 1011. The panel board assembly 1009 can include a printed circuit board (PCB) and a connector. The panel board assembly 1009 can be electrically connected to various elements including the display 1003. The battery 1011 can manage the power of the electronic device 101. The battery 1011 can be an element corresponding to the battery 296 that has been described in FIG. 2 above.

The housing 1017 can include the transparent plate 1001, a frame mould 1013, and a back cover 1015. The frame mould 1013 can fix internal elements of the electronic device 101. The frame mould 1013 can accept the display 1003, the flexible printed circuit board 1005, the bracket 1007, the panel board assembly 1009, and the battery 1011, and can fix the same. The frame mould 1013 can be implemented in a form to protect the internal elements of the display 1003. The frame mould 1013 can be made of a synthetic resin, or, for example, can be made of a metal material, such as stainless steel or titanium (Ti). The back cover 1015 can be disposed on the back surface of the electronic device 101 to prevent the internal elements from being visually recognized. The back cover 1015 can be a variety of films.

Figure 11:
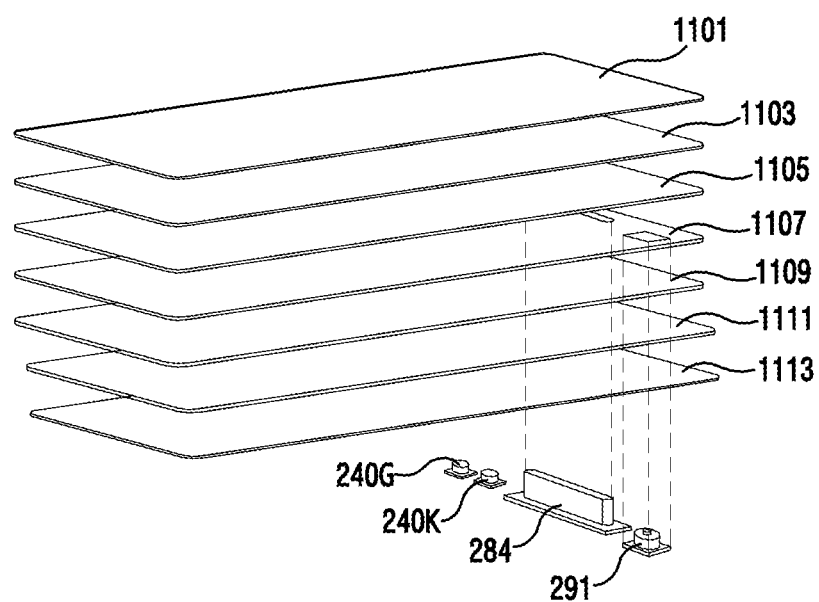
FIG. 11 illustrates an exploded perspective view of an electronic device, according to another embodiment of the present disclosure.

FIG. 11 illustrates an exploded perspective view of an electronic device, according to another embodiment of the present disclosure.

As shown in FIG. 11, the electronic device 101 can include a transparent plate 1101, a first film 1103, a second film 1105, a polarizing plate 1107, a display 1109, a first protector 1111, a second protector 1113, a proximity sensor 240G, an illuminance sensor 240K, a receiver 284, and a camera 291 (for example, the camera module 291). The first film 1103, the second film 1105, the polarizing plate 1107, the first protector 1111, and the second protector 1113 can be added to the configuration shown in FIG. 10. The transparent plate 1101 can be an element corresponding the transparent plate 1001 described in FIG. 10.

The first film 1103 can bond the transparent plate 1101 and a variety of elements that are disposed under the transparent plate 1101. Alternatively, the first film 1103 can block a light that emits from the inside of the electronic device 101 to not pass through to the outside of the display 1109.

The second film 1105 can be disposed between the transparent plate 1101 and the display 1109. The second film 1105, for example, can be an optical elastic resin {for example, super view resin (SVR)}. The visibility of the display 1109 can be enhanced through the second film 1105. Alternatively, the second film 1105 can relieve the impact that is applied to the display 1109. Alternatively, the second film 1105 can control the refractive index of a light incident on the electronic device 101 in order to thereby reduce the scattering of light. Therefore, it is possible to reduce the loss of light incident on the display 1109.

The polarizing plate 1107 can be disposed on the display 1109. The polarizing plate 1107 can convert an incident light that oscillates in various directions into a light (i.e., a polarized light) that oscillates only in one direction.

The display 1109 can be an element corresponding to the display 1003 that has been described in FIG. 10.

The first protector 1111 and/or the second protector 1113 can be disposed under the display 1109. The first protector 1111 and/or the second protector 1113 can protect the display 1109. The first protector 1111 and/or the second protector 1113 can have a color to prevent the elements, such as the display 1109, from being visually recognized. For example, the first protector 1111 and/or the second protector 1113 can have a black color. The first protector 1111 and/or the second protector 1113 can block a light incident from the outside of the electronic device 101.

Although it is not shown, the first protector 1111 can have a plurality of first openings. The second protector 1113 can have a plurality of second openings. The plurality of first openings and the plurality of second openings can be formed to be larger than the size of the proximity sensor 240G, the illuminance sensor 240K, the receiver 284, or the camera 291, respectively. The proximity sensor 240G, the illuminance sensor 240K, the receiver 284, and the camera 291 can be inserted into the plurality of first openings and the plurality of second openings.

The first protector 1111 and the second protector 1113 can have a first opening and a second opening into which the camera 291 is inserted among the plurality of first openings and the plurality of second openings, respectively, in order not to disturb the light incident on the camera 291. Since the first protector 1111 and the second protector 1113 block a light, a light can be incident on the camera 291 through the first opening and second opening into which camera 291 is inserted.

Figure 12A:
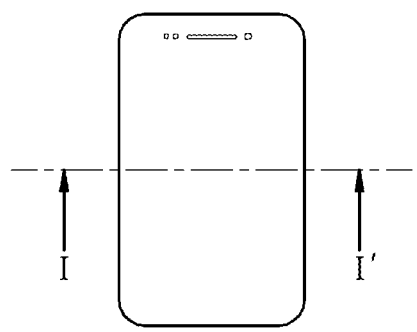
FIG. 12A is a front view of an electronic device, according to an embodiment of the present disclosure.

FIG. 12A is a front view of an electronic device, according to an embodiment of the present disclosure. FIGS. 12B to 12G illustrate cross-sections along the line I-I'.

Figure 12B:
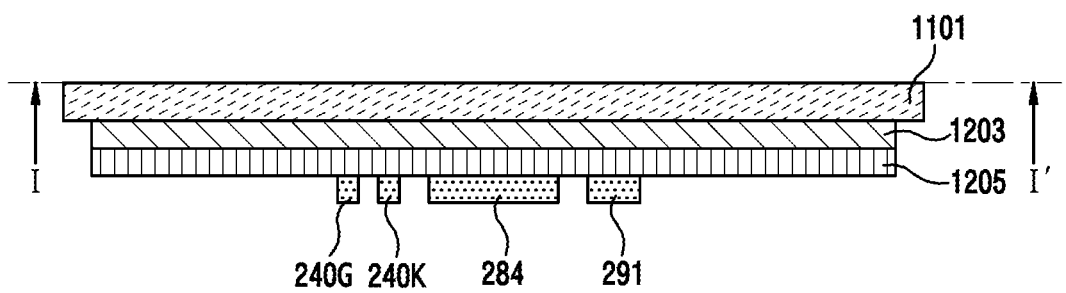
FIGS. 12B to 12G illustrate cross-sections along the line I-I'.
Figure 12C:
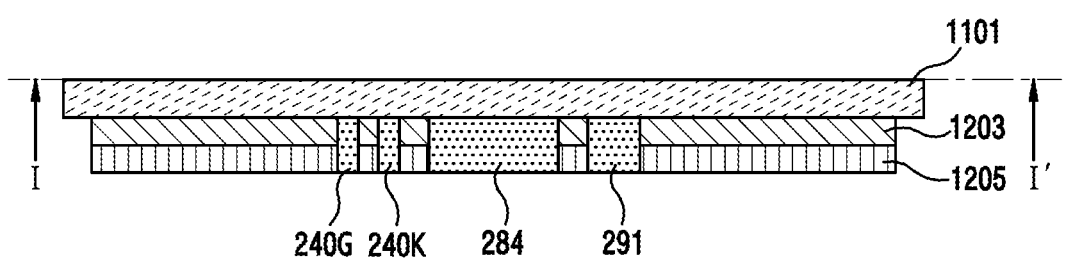
Figure 12D:
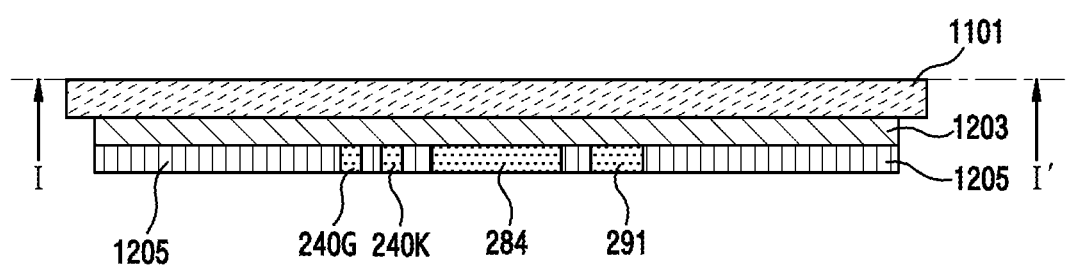

According to various embodiments, the electronic device 101 can include a transparent plate 1101, a touch panel 1203 (for example, the touch panel 252), a display 1205, a proximity sensor 240G, an illuminance sensor 240K, a receiver 284, and a camera 291. As shown in FIG. 12B, the proximity sensor 240G, the illuminance sensor 240K, the receiver 284, and the camera 291 (for example, the camera module 291) can be disposed on the lower surface of the display 1205. According to various embodiments, as shown in FIG. 12C, the proximity sensor 240G, the illuminance sensor 240K, the receiver 284, and the camera 291 can be disposed in the same layer as the display 1205 and the touch panel 1203. That is, the proximity sensor 240G, the illuminance sensor 240K, the receiver 284, and the camera 291 can be integrally formed with the touch panel 1203 and the display 1205. According to various embodiments, as shown in FIG. 12D, the proximity sensor 240G, the illuminance sensor 240K, the receiver 284, and the camera 291 can be disposed in the same layer as the display 1205. That is, the proximity sensor 240G, the illuminance sensor 240K, the receiver 284, and the camera 291 can be integrally formed with the display 1205.

Figure 12E:
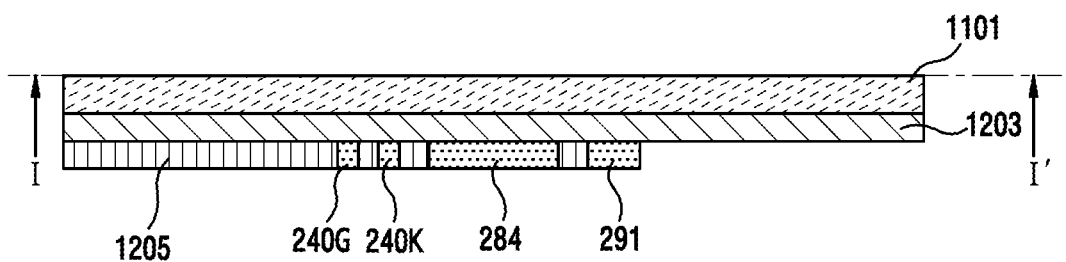
Figure 12F:
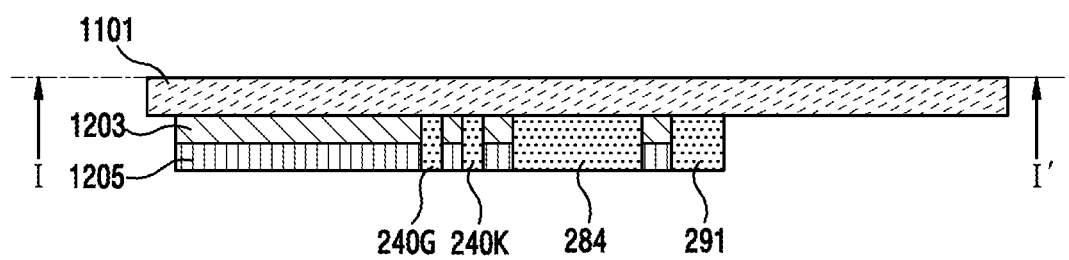
Figure 12G:
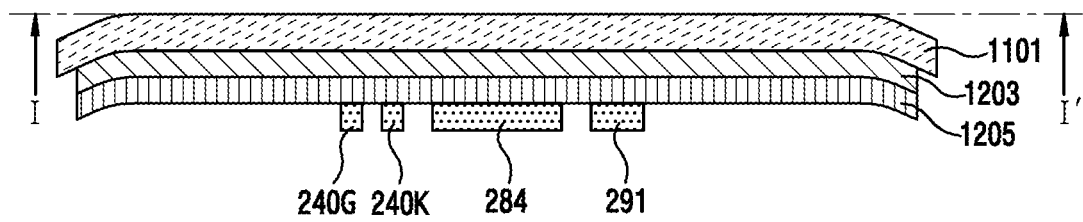

According to various embodiments, as shown in FIG. 12E, the touch panel 1203 can be formed in the same size as the transparent plate 1101, and the display 1205 can be formed to be smaller than the transparent plate 1101 and the touch panel 1203. The proximity sensor 240G, the illuminance sensor 240K, the receiver 284, and the camera 291 can be disposed in the same layer as the display 1205. That is, the proximity sensor 240G, the illuminance sensor 240K, the receiver 284, and the camera 291 can be integrally formed with the display 1205. According to various embodiments, as shown in FIG. 12F, the touch panel 1203 and display 1205 can be formed to be smaller than the transparent plate 1101. The proximity sensor 240G, the illuminance sensor 240K, the receiver 284, and the camera 291 can be disposed in the same layer as the display 1205 and the touch panel 1203. That is, the proximity sensor 240G, the illuminance sensor 240K, the receiver 284, and the camera 291 can be integrally formed with the touch panel 1203 and the display 1205. According to various embodiments, as shown in FIG. 12G, at least one side of the transparent plate 1101, the touch panel 1203, and the display 1205 can be bent. One side of the transparent plate 1101, the touch panel 1203, and the display 1205 can be bent from the front. The transparent plate 1101, the touch panel 1203, and the display 1205 can include a curved surface. At least one side of the transparent plate 1101, the touch panel 1203, and the display 1205 can include a curved surface. The proximity sensor 240G, the illuminance sensor 240K, the receiver 284, and the camera 291 can be disposed on the lower surface of the display 1205.

Figure 13A:
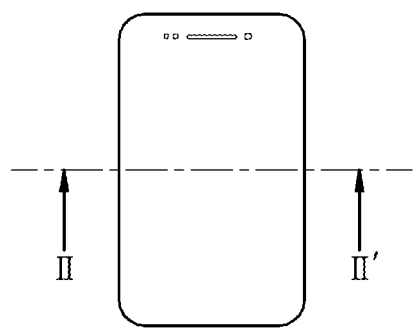
FIG. 13A is a front view of an electronic device, according to another embodiment of the present disclosure.

FIG. 13A is a front view of an electronic device, according to another embodiment of the present disclosure. FIGS. 13B to 13G illustrate cross-sections along the line II-II'.

Figure 13B:
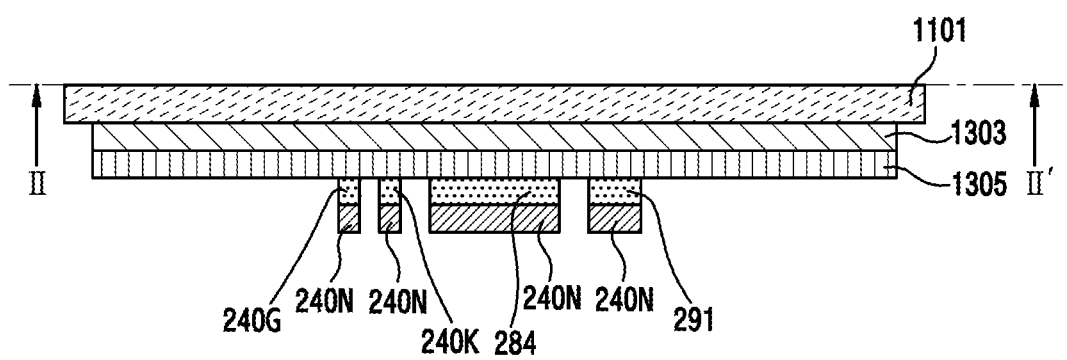
FIGS. 13B to 13G illustrate cross-sections along the line II-II'.

According to various embodiments, the electronic device 101 can include a transparent plate 1101, a touch panel, a display 1305, a proximity sensor 240G, an illuminance sensor 240K, a receiver 284, a camera 291, (for example, the camera module 291), and one or more pressure sensors 240N. Since the display 1305 is disposed on the front surface of the electronic device 101, physical keys can be substituted by the pressure sensors 240N. The physical keys can be substituted by the pressure sensors 240N. The pressure sensors 240N can have various shapes or sizes, and any number of pressure sensors can be provided. The pressure sensor 240N can be provided to be transparent in order not to be visually recognized from the outside. The pressure sensor 240N can be opaque. As shown in FIG. 13B, the proximity sensor 240G, the illuminance sensor 240K, the receiver 284, and the camera 291 can be disposed on the lower surface of the display 1305. A plurality of pressure sensors 240N can be disposed on the lower surfaces of the proximity sensor 240G, the illuminance sensor 240K, the receiver 284, and the camera 291, respectively.

Figure 13C:
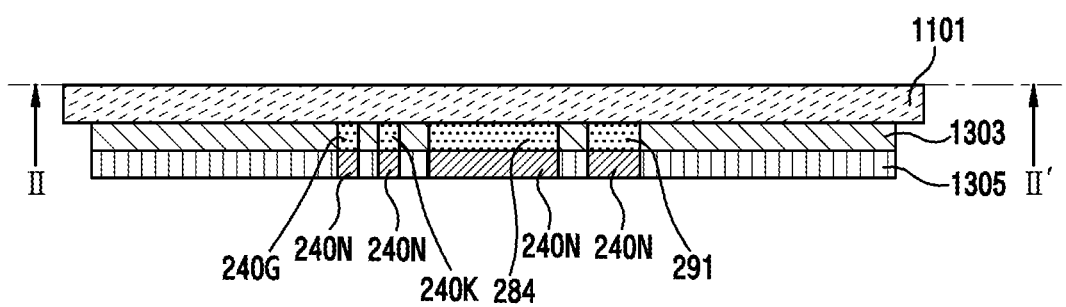
Figure 13D:
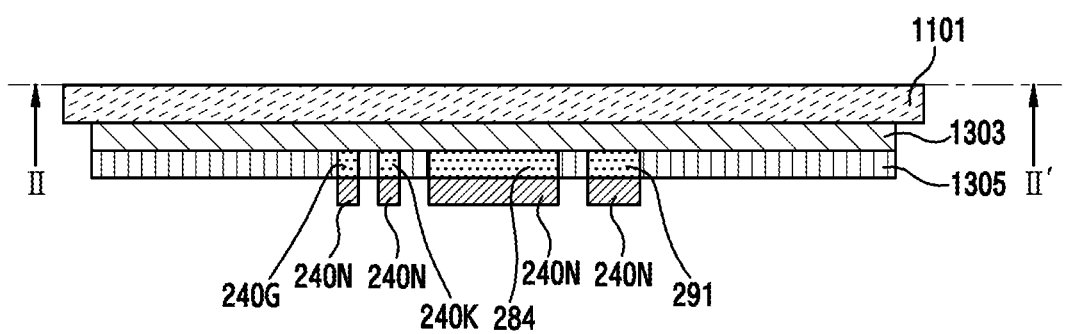

According to various embodiments, as shown in FIG. 13C, the proximity sensor 240G, the illuminance sensor 240K, the receiver 284, and the camera 291 can be disposed in the same layer as the touch panel 1303. A plurality of pressure sensors 240N that are disposed on the lower surfaces of the proximity sensor 240G, the illuminance sensor 240K, the receiver 284, and the camera 291 can be disposed in the same layer as the display 1305. That is, the proximity sensor 240G, the illuminance sensor 240K, the receiver 284, and the camera 291 can be formed integrally with the touch panel 1303 on the display 1305. According to various embodiments, as shown in FIG. 13D, the proximity sensor 240G, the illuminance sensor 240K, the receiver 284, and the camera 291 can be disposed in the same layer as the display 1305. That is, the proximity sensor 240G, the illuminance sensor 240K, the receiver 284, and the camera 291 can be formed integrally with the display 1305. A plurality of pressure sensors 240N can be disposed on the lower surfaces of the proximity sensor 240G, the illuminance sensor 240K, the receiver 284, and the camera 291.

Figure 13E:
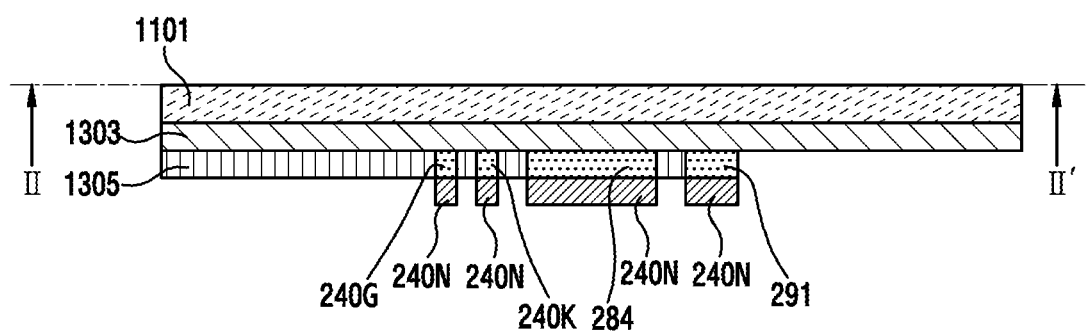
Figure 13F:
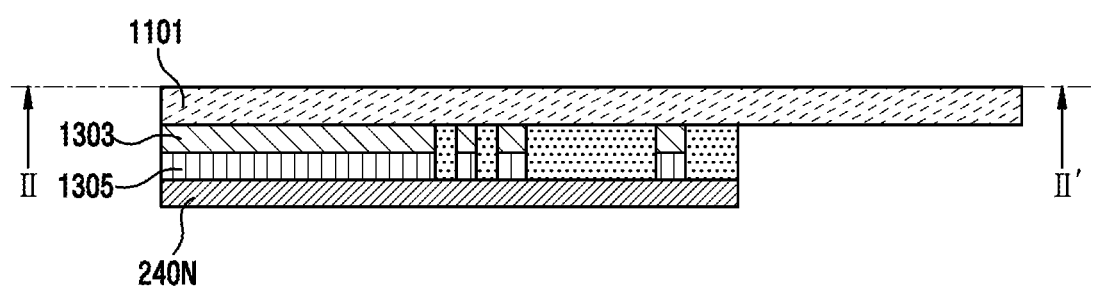
Figure 13G:
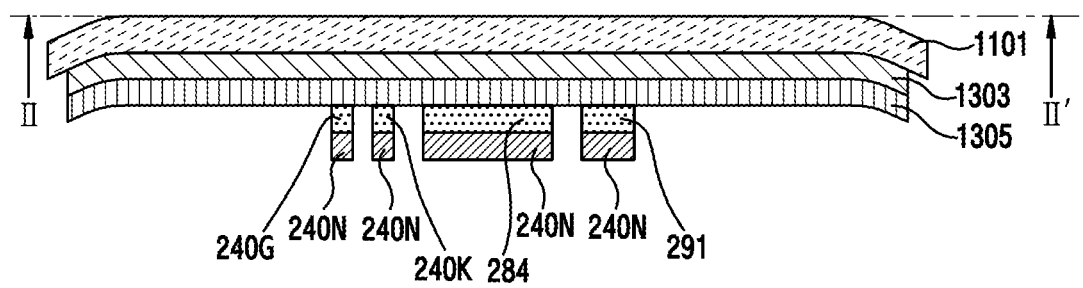

According to various embodiments, as shown in FIG. 13E, the touch panel 1303 can be formed in the same size as the transparent plate 1101, and the display 1305 can be formed to be smaller than the transparent plate 1101 and the touch panel 1303. The proximity sensor 240G, the illuminance sensor 240K, the receiver 284, and the camera 291 can be disposed in the same layer as the display 1305. That is, the proximity sensor 240G, the illuminance sensor 240K, the receiver 284, and the camera 291 can be formed integrally with the display 1305. A plurality of pressure sensors 240N can be disposed on the lower surfaces of the proximity sensor 240G, the illuminance sensor 240K, the receiver 284, and the camera 291. According to various embodiments, as shown in FIG. 13F, the proximity sensor 240G, the illuminance sensor 240K, the receiver 284, and the camera 291 can be disposed in the same layer as the touch panel 1303 and the display 1305. That is, the proximity sensor 240G, the illuminance sensor 240K, the receiver 284, and the camera 291 can be formed integrally with the touch panel 1303 and the display 1305. The pressure sensor 240N can be disposed on the lower surface of the display 1305. According to various embodiments, as shown in FIG. 13G, at least one side of the transparent plate 1101, the touch panel 1303, and the display 1305 can be bent. One side of the transparent plate 1101, the touch panel 1303, and the display 1305 can be bent from the front. The transparent plate 1101, the touch panel 1303, and the display 1305 can include a curved surface. At least one side of the transparent plate 1101, the touch panel 1303, and the display 1305 can include a curved surface. The proximity sensor 240G, the illuminance sensor 240K, the receiver 284, and the camera 291 can be disposed on the lower surface of the display 1305. A plurality of pressure sensors 240N can be disposed on the lower surfaces of the proximity sensor 240G, the illuminance sensor 240K, the receiver 284, and the camera 291, respectively.

Figure 14A:
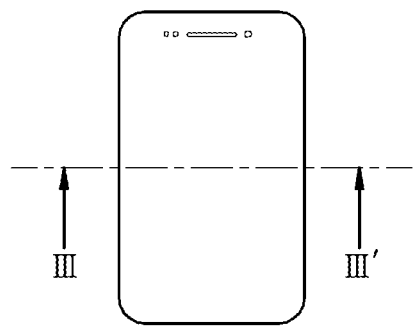
FIG. 14A is a front view of an electronic device, according to another embodiment of the present disclosure.

FIG. 14A is a front view of an electronic device, according to another embodiment of the present disclosure. FIGS. 14B to 14H illustrate cross-sections along the line III-III'.

Figure 14B:
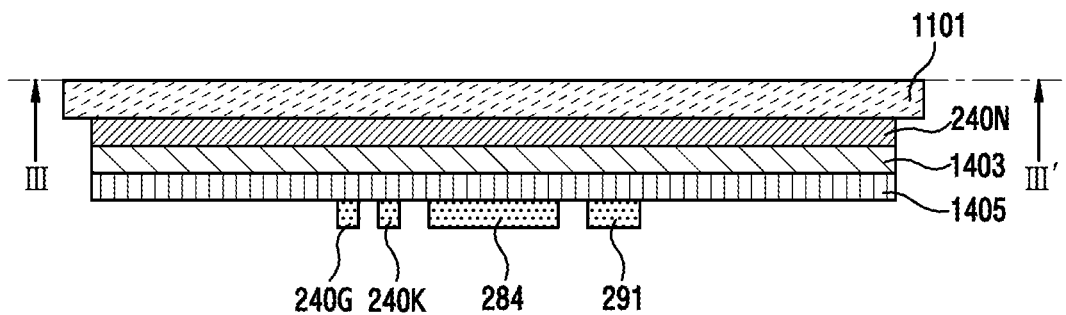
FIGS. 14B to 14H illustrate cross-sections along the line III-III'.

According to various embodiments, the electronic device 101 can include a transparent plate 1101, a touch panel, a display 1305, a proximity sensor 240G, an illuminance sensor 240K, a receiver 284, a camera 291, (for example, the camera module 291), and one or more pressure sensors 240N. The display 1405 is disposed on the front surface of the electronic device 101, the physical keys can be substituted by the pressure sensors 240N. The physical keys can be substituted by the pressure sensors 240N. The pressure sensors 240N can have various shapes or sizes, and any number of pressure sensors can be provided. The pressure sensor 240N can be provided to be transparent in order not to be visually recognized from the outside. The pressure sensor 240N can be opaque. As shown in FIG. 14B, the pressure sensor 240N can be disposed on the touch panel 1403 (for example, the touch panel 252). The proximity sensor 240G, the illuminance sensor 240K, the receiver 284, and the camera 291 can be disposed on the lower surface of the display 1405.

Figure 14C:
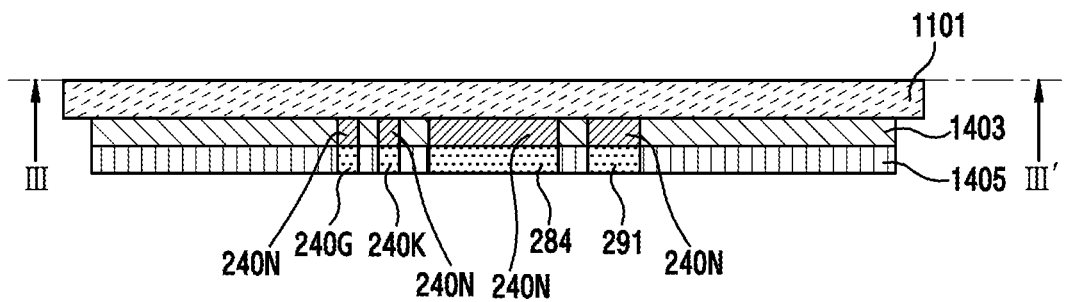
Figure 14D:
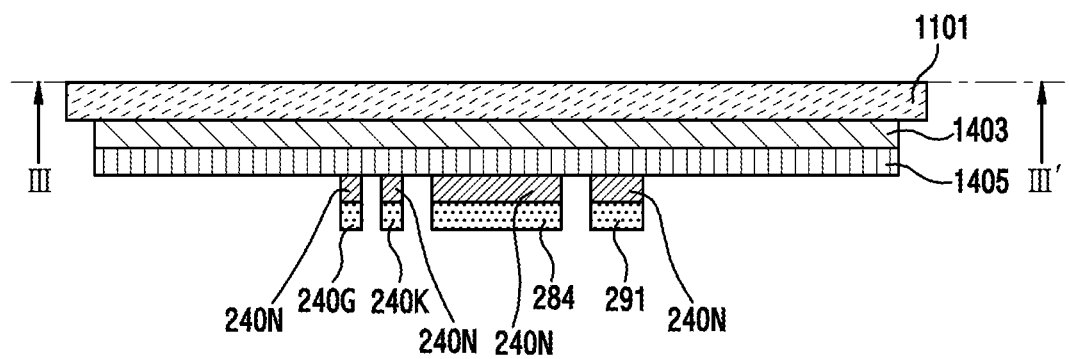

According to various embodiments, as shown in FIG. 14C, a plurality of pressure sensors 240N can be disposed in the same layer as the touch panel 1403. The proximity sensor 240G, the illuminance sensor 240K, the receiver 284, and the camera 291 can be disposed in the same layer as the display 1405. A plurality of pressure sensors 240N can be disposed on the upper surfaces of the proximity sensor 240G, the illuminance sensor 240K, the receiver 284, and the camera 291, respectively. That is, a plurality of pressure sensors 240N can be formed integrally with the touch panel 1403 on the display 1405. According to various embodiments, as shown in FIG. 14D, the proximity sensor 240G, the illuminance sensor 240K, the receiver 284, and the camera 291 can be disposed on the lower surfaces of a plurality of pressure sensors 240N that are disposed on the lower surface of the display 1405.

Figure 14E:
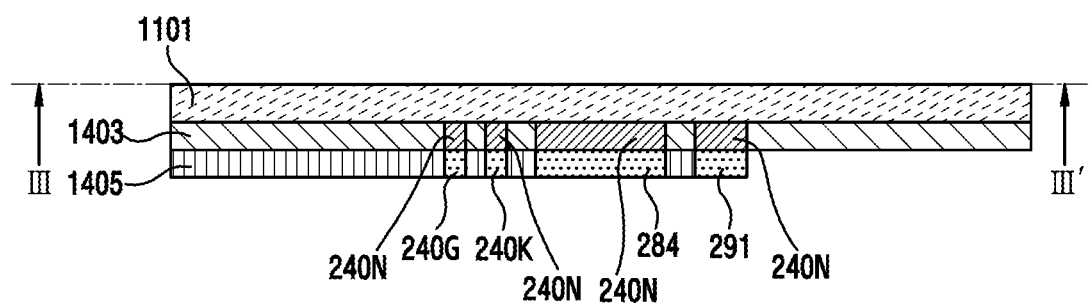
Figure 14F:
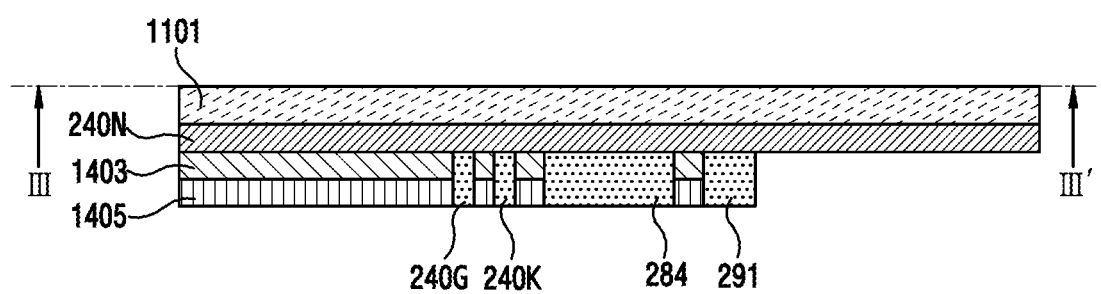

According to various embodiments, as shown in FIG. 14E, the touch panel 1403 can be formed in the same size as the transparent plate 1101, and the display 1405 can be formed to be smaller than the transparent plate 1101 and the touch panel 1403. The proximity sensor 240G, the illuminance sensor 240K, the receiver 284, and the camera 291 can be disposed in the same layer as the display 1405. A plurality of pressure sensors 240N can be disposed on the upper surfaces of the proximity sensor 240G, the illuminance sensor 240K, the receiver 284, and the camera 291. That is, the plurality of pressure sensors 240N can be disposed in the same layer as the touch panel 1403 to be formed integrally with the touch panel 1403. According to various embodiments, as shown in FIG. 14F, the pressure sensor 240N can be disposed on the touch panel 1403. The proximity sensor 240G, the illuminance sensor 240K, the receiver 284, and the camera 291 can be disposed in the same layer as the touch panel 1403 and the display 1405. That is, the proximity sensor 240G, the illuminance sensor 240K, the receiver 284, and the camera 291 can be formed integrally with the touch panel 1403 and the display 1405.

Figure 14G:
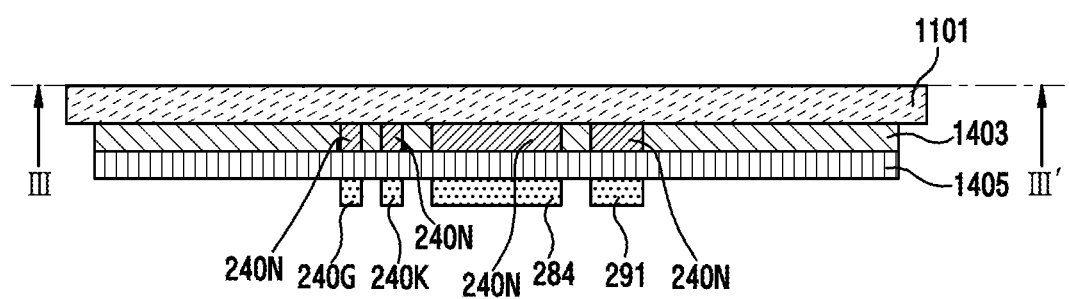
Figure 14H:
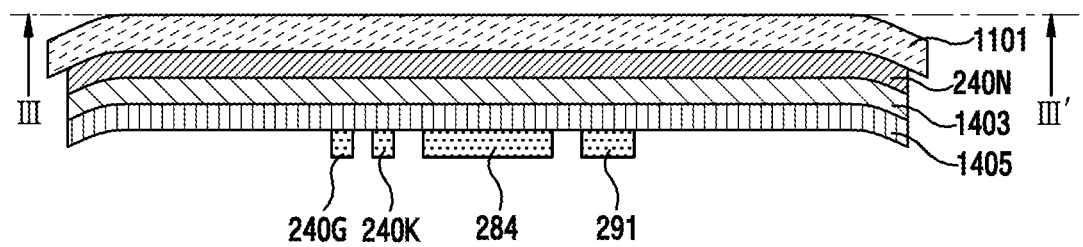

According to various embodiments, as shown in FIG. 14G, a plurality of pressure sensors 240N can be disposed in the same layer as the touch panel 1403. A plurality of pressure sensors 240N can be disposed on the display 1405. The proximity sensor 240G, the illuminance sensor 240K, the receiver 284, and the camera 291 can be disposed on the lower surface of the display 1405. The plurality of pressure sensors 240N can be disposed at the same interval as the proximity sensor 240G, the illuminance sensor 240K, the receiver 284, and the camera 291 that are disposed on the lower surface of the display 1405. According to various embodiments, as shown in FIG. 14H, at least one side of the transparent plate 1101, the touch panel 1403, and the display 1405 can be bent. One side of the transparent plate 1101, the touch panel 1403, and the display 1405 can be bent from the front. The transparent plate 1101, the touch panel 1403, and the display 1405 can include a curved surface. At least one side of the transparent plate 1101, the touch panel 1403, and the display 1405 can include a curved surface. The proximity sensor 240G, the illuminance sensor 240K, the receiver 284, and the camera 291 can be disposed on the lower surface of the display 1405. A plurality of pressure sensors 240N can be disposed on the upper surfaces of the proximity sensor 240G, the illuminance sensor 240K, the receiver 284, and the camera 291.

Figure 15A:
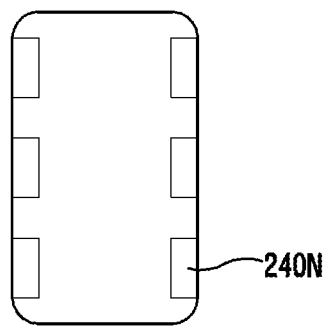
FIGS. 15A and 15B are front view of an electronic device, according to another embodiment of the present disclosure.
Figure 15B:
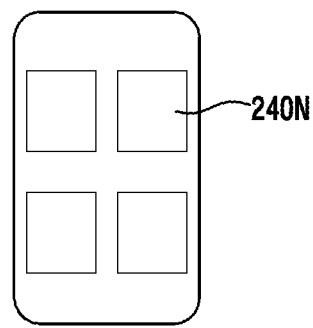

FIGS. 15A and 15B are front view of an electronic device, according to another embodiment of the present disclosure.

As shown in FIGS. 15A and 15B, the pressure sensors 240N can have various shapes, sizes, and dispositions. For example, the pressure sensors 240N can be disposed the front surface of the electronic device 101 in a variety of numbers and sizes. At this time, the pressure sensors 240N can be configured to be transparent.

According to an embodiment, the electronic device 101 can include: at least one sensor; a touch panel configured to be disposed to detect a touch corresponding to the at least one sensor; a display, and a processor, wherein the processor is configured to identify an area where a touch is detected, identify a sensor corresponding to the area, control the display to display a user interface to control a function corresponding to the identified sensor, and control the function corresponding to the identified sensor.

The processor can be configured to: identify a central point of the area where the touch is detected; identify a position of the touch based on the central point; and identify a sensor corresponding to the position of the touch.

The at least one sensor can comprise at least one of a proximity sensor, an illuminance sensor, a camera, a biometric sensor, a receiver, a temperature sensor, a humidity sensor, an ultraviolet sensor, or soft keys.

The processor can be configured to convert, based on the touch, the sensor into one of either an activated state or an inactivated state, which is the function corresponding to the identified sensor.

The processor can be configured to control, based on the touch, one of either a display brightness or a sound volume, which is the function corresponding to the sensor.

The electronic device can further include a pressure sensor, wherein the processor is configured to: identify a pressure change in the area where the touch is detected; identify a position of the touch based on the pressure change; and identify a sensor corresponding to the position of the touch.

The processor can be configured to convert, based on the pressure change, the sensor into one of either an activated state or an inactivated state, which is the function corresponding to the sensor.

The processor can be configured to control, based on the pressure change, one of either a display brightness or a sound volume, which is the function corresponding to the identified sensor.

The processor can be configured to update the displayed user interface according to a control request.

The processor can be configured to update the displayed user interface according to the function control.

Figure 16:
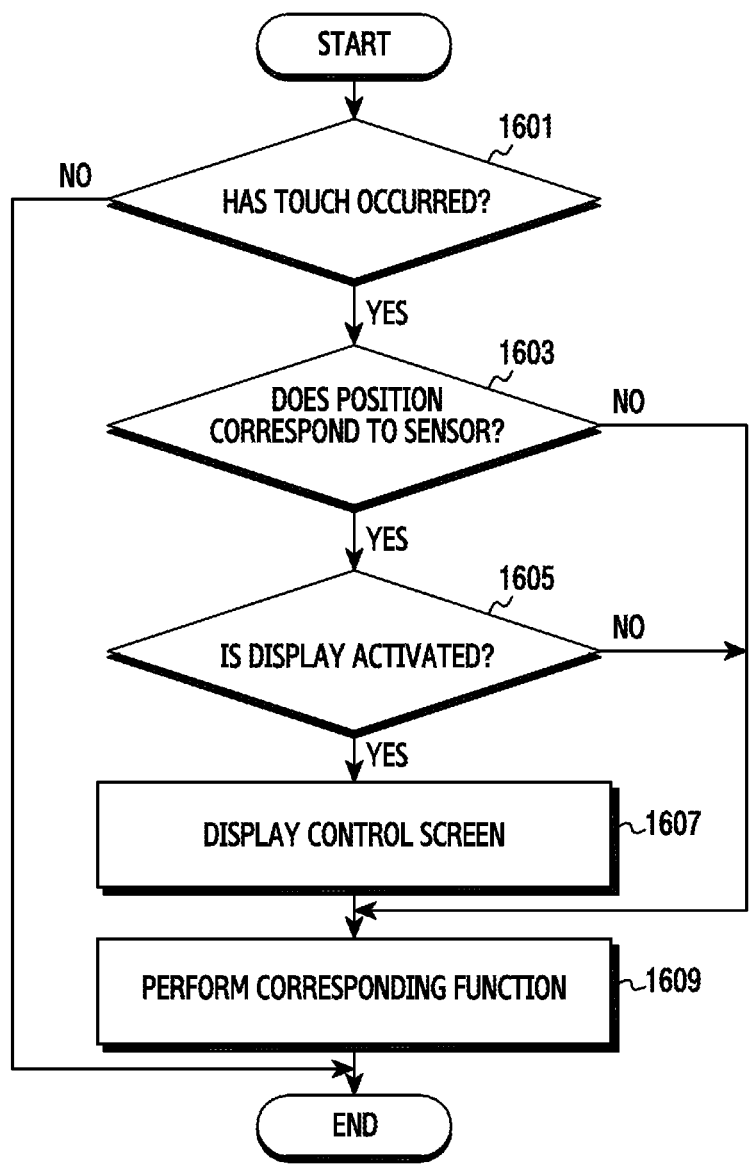
FIG. 16 is a flowchart to explain an operating method of an electronic device, according to an embodiment of the present disclosure.

FIG. 16 is a flowchart to explain an operating method of an electronic device, according to an embodiment of the present disclosure.

As shown in FIG. 16, the processor 210 can identify whether or not a touch occurs in operation 1601. If a touch occurs in operation 1601, the processor 210 can perform operation 1603, and if no touch occurs in operation 1601, the processor 210 can terminate the corresponding process. In operation 1603, the processor 210 can identify whether or not the position in which the touch has occurred corresponds to a physically equipped sensor that is provided in the electronic device 101. For example, a physically equipped sensor provided in the electronic device 101 and a coordinate value corresponding to the sensor on the display 160 are mapped with each other to then be stored in the memory 230. At this time, when mapping the coordinate value corresponding to the sensor, coordinate values with respect to the area within a threshold distance based on the coordinate value can be mapped together to then be stored in the memory 230. In operation 1603, the processor 210 can identify a coordinate value for the position in which the touch has occurred. The processor 210 can identify the sensor that is mapped to the identified coordinate value. If the position in which the touch has occurred corresponds to a specific sensor as a result of the identification in operation 1603, the processor 210 can perform operation 1605. If the position in which the touch has occurred does not correspond to a specific sensor as a result of the identification in operation 1603, the processor 210 can perform operation 1609. In operation 1609, the processor 210 can perform the corresponding function. According to an embodiment, the processor 210 can perform the corresponding function (for example, the execution of an icon that is placed in the position in which the touch has occurred) in operation 1609. For example, the specific sensor can include a proximity sensor, an illuminance sensor, a receiver, a camera, a volume up/down button, a fingerprint sensor, a power button, or the like.

In operation 1605, the processor 210 can identify whether or not the display 160 is in the activated state. If the display 160 is in the activated state as a result of the identification in operation 1605, the processor 210 can perform operation 1607. If the display 160 is not in the activated state as a result of the identification in operation 1605, the processor 210 can perform operation 1609. The processor 210 can perform the corresponding function in operation 1609. According to an embodiment, the processor 210 can control a specific sensor corresponding to the position in which the touch has occurred in operation 1609. For example, if a touch occurs on the camera 291 (for example, the camera module 291) while the display 160 is in the inactivated state, the processor 210 can activate the camera 291 that is provided on the front surface of the electronic device 101 in order to thereby perform a selfie function.

In operation 1607, the processor 210 can display, on the display 160, a screen that is related to a specific sensor corresponding to the position in which the touch has occurred. The screen can be a control screen in which the current state of the sensor is displayed and a function related to the sensor can be controlled. The processor 210 can perform the corresponding function in operation 1609. According to an embodiment, the processor 210 can control a specific sensor corresponding to the position in which the touch has occurred in operation 1609. Although the processor 210 displays, on the display 160, the control screen for a specific sensor corresponding to the position in which the touch has occurred and, thereafter, controls the specific sensor in the embodiment of the present disclosure, it is not limited thereto. For example, the processor 210 can control a specific sensor corresponding to the position in which the touch has occurred according to the occurred touch, and can then display the control screen on the display 160. The processor 210 can simultaneously perform the control of a specific sensor according to the occurred touch and the displaying of the control screen on the display 160.

Figure 17A:
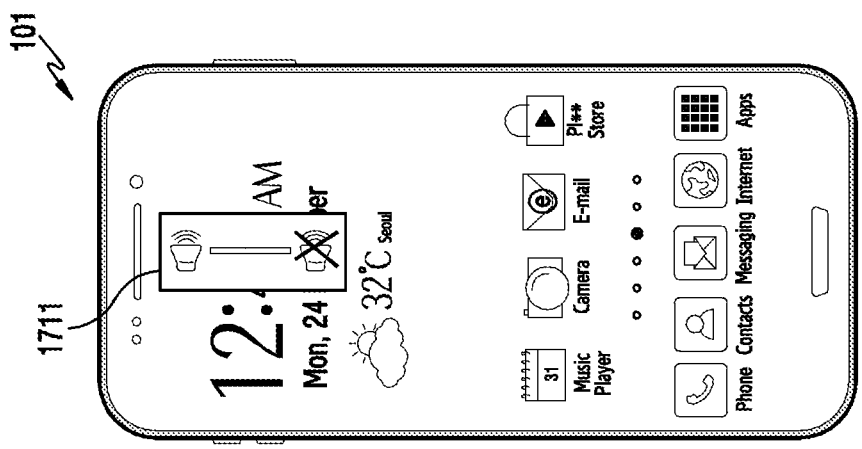
FIGS. 17A and 17B are example views of a screen showing an operating method of an electronic device, according to an embodiment of the present disclosure.
Figure 17B:
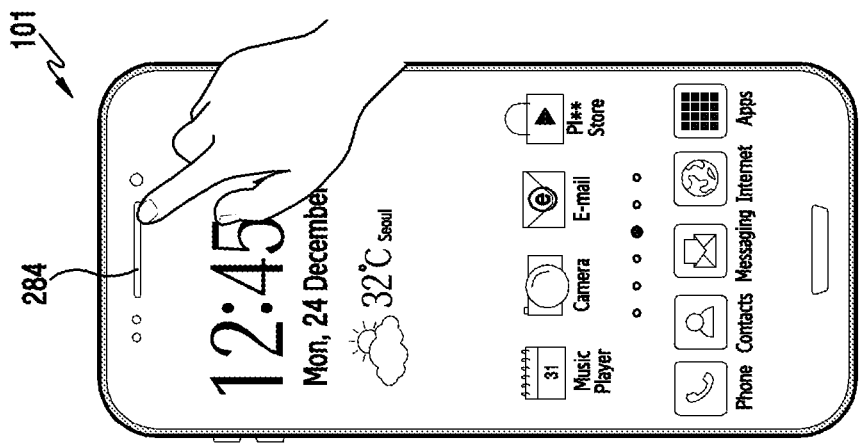

FIGS. 17A and 17B are example view of a screen showing an operating method of an electronic device, according to an embodiment of the present disclosure.

According to various embodiments, as shown in FIGS. 17A and 17B, if a touch occurs in the electronic device 101, the processor 210 can identify whether or not the display 160 is activated. The processor 210 can identify that the display 160 is in the activated state and the touch occurrence position corresponds to the receiver 284 that is provided in the electronic device 101 as shown in FIG. 17A. The processor 210 can identify the central point of the area in which the touch is detected. The processor 210 can more accurately identify the position in which the touch has occurred based on the identified central point.

The processor 210, as shown in FIG. 17B, can display, on the display 160, a screen that shows the current state of the receiver 284 and that is related to the receiver 284 (for example, a control screen 1711 for controlling the receiver 284). When a touch occurs, the processor 210 can convert the state of the receiver 284 into the activated state or the inactivated state. For example, the control screen 1711 can be displayed in the position close to the receiver 284. According to the embodiment, when a touch occurs on the control screen 1711, the processor 210 can set the volume and state of an incoming sound of the receiver 284 based on the occurred touch. According to an embodiment, the processor 210 can set the volume of an incoming sound based on touches that are repeated in the position of the receiver 284. According to an embodiment, if a touch occurs in the position of the receiver 284 while the display 160 is not activated, the processor 210 can convert the state of the receiver 284 into the activated state or into the inactivated state. The processor 210 can activate the display 160 that is in the inactivated state.

According to various embodiments, when a touch occurs in the electronic device 101, the processor 210 can identify the position in which the touch has occurred and a pressure change at the touch occurrence time. The processor 210 can identify that touch occurrence position corresponds to the receiver 284 that is provided in the electronic device 101. The processor 210 can identify the central point of the area in which the touch is detected. The processor 210 can identify the position in which the touch has occurred based on the identified central point and based on the position where the pressure change is the maximum.

If the identified pressure change is less than a threshold value, the processor 210 can display, on the display 160, a control screen 1711 that shows the current state of the receiver 284 and controls the receiver 284. If the identified pressure change is equal to, or more than, a threshold value, the processor 210 can convert the state of the receiver 284 into the activated state or into the inactivated state. For example, the control screen 1711 can be displayed in the position close to the receiver 284. The processor 210 can control the volume of an incoming sound of the receiver 284 based on the identified pressure change. For example, when the pressure change gradually increases in the position of the receiver 284, the processor 210 can gradually increase the volume of the incoming sound of the receiver 284.

Figure 18C:
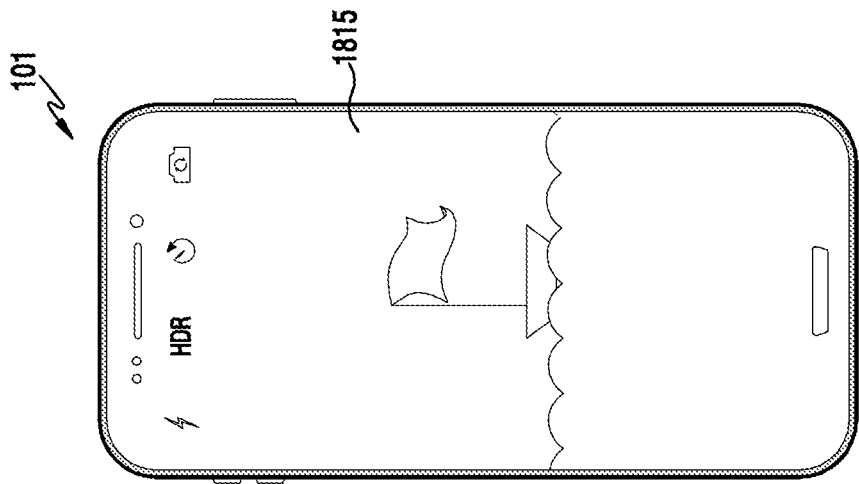
FIGS. 18A to 18C are example views of a screen showing an operating method of an electronic device, according to another embodiment of the present disclosure.
Figure 18B:
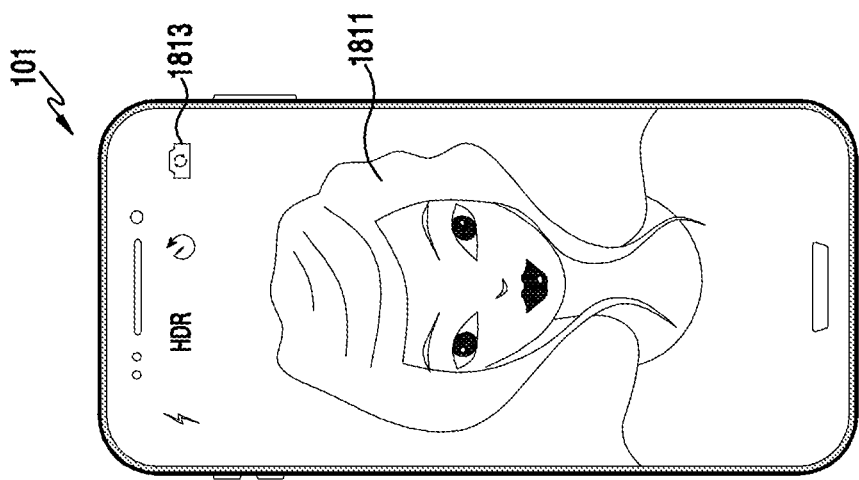
Figure 18A:
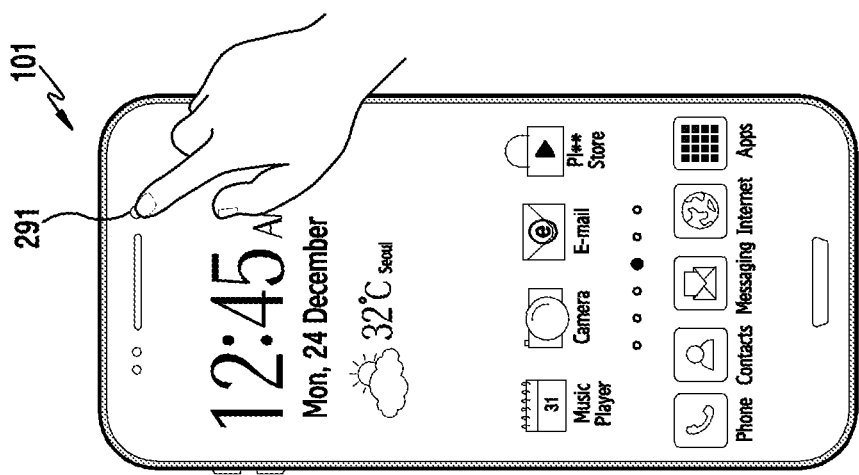

FIGS. 18A to 18C are example views of a screen showing an operating method of an electronic device, according to another embodiment of the present disclosure.

According to various embodiments, as shown in FIG. 18A, if a touch occurs in the electronic device 101, the processor 210 can identify whether or not the display 160 is activated. The processor 210 can identify that the display 160 is in the activated state and the touch occurrence position corresponds to the camera 291 (for example, the camera module 291) that is provided on the front surface of the electronic device 101 as shown in FIG. 18A. The processor 210, as shown in FIG. 18B, can activate the camera 291 that is provided on the front surface, and can display, on the display 160, a screen that is related to the camera 291 (for example, a control screen 1811 for controlling the camera 291). The control screen 1811 can be an external image that is obtained by the activated camera 291. The processor 210 can control the setting of the camera 291 (for example, auto-focusing, timer, flash, or the like) according to a touch input that occurs on the control screen 1811.

The processor 210 can receive, through a specific icon 1813, a signal for activating a camera (not shown) that is provided on the back surface of the electronic device 101 while the control screen 1811 is displayed on the display 160 as shown in FIG. 18B. The processor 210, as shown in FIG. 18B, can detect that a touch input occurs on the camera 291 while the control screen 1811 is displayed on the display 160. The processor 210 can activate the camera that is provided on the back surface of the electronic device 101 according to a signal with respect to a specific icon 1813 or according to a touch input that occurs the camera 291, and can display, on the display 160, an external image that is obtained by the camera through the control screen 1815 as shown in FIG. 18C. According to an embodiment, if a touch input of less than a threshold time occurs while the display 160 is in the activated state as shown in FIG. 18A, the processor 210 can activate the camera 291 that is provided on the front surface of the electronic device 101, and if a touch input of equal to, or more than, a threshold time occurs, the processor 210 can activate the camera that is provided on the back surface of the electronic device 101.

According to various embodiments, when a touch occurs in the electronic device 101, the processor 210 can identify the position in which the touch has occurred and a pressure change at the touch occurrence time. The processor 210 can identify that the touch occurrence position corresponds to the camera 291 that is provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can activate the camera 291 that is provided on the front surface of the electronic device 101, and if the identified pressure change is equal to, or more than, a threshold value, the processor 210 can activate the camera that is provided on the back surface of the electronic device 101.

Figure 19A:
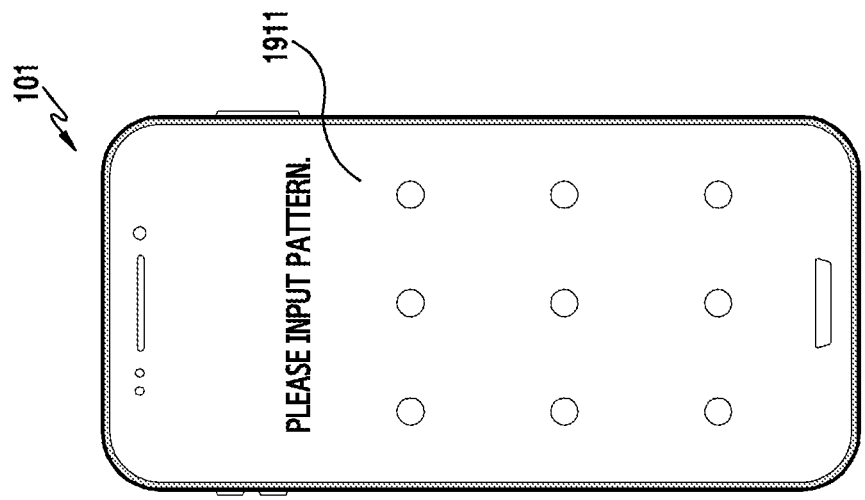
FIGS. 19A to 19B are example views of a screen showing an operating method of an electronic device, according to another embodiment of the present disclosure.
Figure 19B:
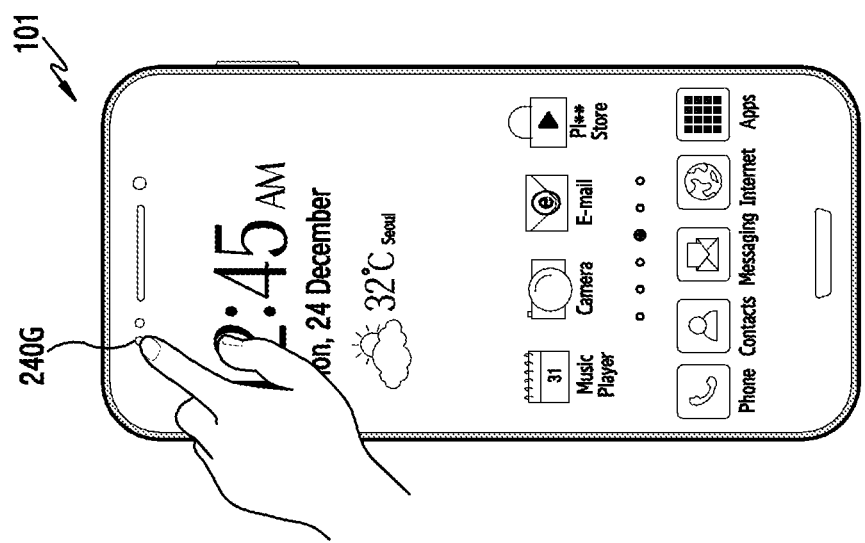

FIGS. 19A and 19B are example views of a screen showing an operating method of an electronic device, according to another embodiment of the present disclosure.

According to various embodiments, as shown in FIGS. 19A and 19B, if a touch occurs in the electronic device 101, the processor 210 can identify whether or not the display 160 is activated. The processor 210 can identify that the display 160 is in the activated state and the touch occurrence position corresponds to the proximity sensor 240G that is provided in the electronic device 101 as shown in FIG. 19A. The processor 210, as shown in FIG. 19B, can display, on the display 160, a screen that is related to the proximity sensor 240G (for example, a control screen 1911 that is a locked screen).

According to various embodiments, when a touch occurs in the electronic device 101, the processor 210 can identify the position in which the touch has occurred and a pressure change at the touch occurrence time. The processor 210 can identify that the touch occurrence position corresponds to the proximity sensor 240G that is provided in the electronic device 101. The processor 210 can identify the central point of the area in which the touch is detected. The processor 210 can identify the position in which the touch has occurred based on the identified central point and based on the position where the pressure change is the maximum. If the identified pressure change is equal to, or more than, a threshold value, the processor 210 can change the screen displayed on the display 160 into a control screen 1911.

FIGS. 20A to 20B are example views of a screen showing an operating method of an electronic device, according to another embodiment of the present disclosure.

According to various embodiments, as shown in FIGS. 20A to 20B, if a touch occurs in the electronic device 101, the processor 210 can identify whether or not the display 160 is activated. The processor 210 can identify that the display 160 is in the activated state and the touch occurrence position corresponds to the illuminance sensor 240K that is provided in the electronic device 101 as shown in FIG. 20A.

The processor 210, as shown in FIG. 20B, can display, on the display 160, a screen that shows the current state of the illuminance sensor 240K and is related to the illuminance sensor 240K (for example, a control screen 2011 for controlling the illuminance sensor 240K). The processor 210 can switch the operation mode of the illuminance sensor 240K into the automatic mode or into the manual mode when a touch occurs. In the case of the automatic mode, the illuminance sensor 240K can be activated to automatically adjust the brightness of the display 160 based on the brightness of the external environment. When the illuminance sensor 240K is in the manual mode, the illuminance sensor 240K is not activated and the display 160 can be controlled to have a predetermined brightness regardless of the brightness of the external environment. For example, the control screen 2011 can be displayed in the position close to the illuminance sensor 240K. According to the embodiment, when a touch occurs on the control screen 2011, the processor 210 can control the illuminance sensor 240K based on the occurred touch to then adjust the brightness of the display 160. According to the embodiment, the processor 210 can adjust the brightness of the illuminance sensor 240K based on the touch that is consistently repeated in the position of the illuminance sensor 240K.

According to various embodiments, when a touch occurs in the electronic device 101, the processor 210 can identify the position in which the touch has occurred and a pressure change at the touch occurrence time. The processor 210 can identify that the touch occurrence position corresponds to the proximity sensor 240G that is provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can display, on the display 160, the control screen 2011 that shows the current state of the illuminance sensor 240K and that can control the illuminance sensor 240K. If the identified pressure change is equal to, or more than, a threshold value, the processor 210 can convert the state of the illuminance sensor 240K into the activated state or into the inactivated state to then switch the mode thereof into the automatic mode or into the manual mode. For example, the control screen 2011 can be displayed in the position close to the illuminance sensor 240K. The processor 210 can control the illuminance sensor 240K based on the identified pressure change to then set the brightness of the display 160. For example, when the pressure change gradually increases in the position of the illuminance sensor 240K, the processor 210 can gradually increase the brightness of the display 160.

Figure 21A:
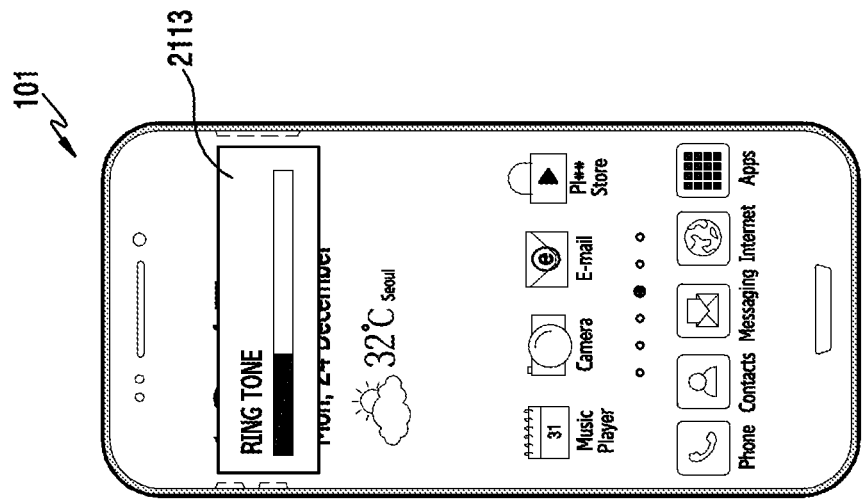
FIGS. 21A to 21B are example views of a screen showing an operating method of an electronic device, according to another embodiment of the present disclosure.
Figure 21B:
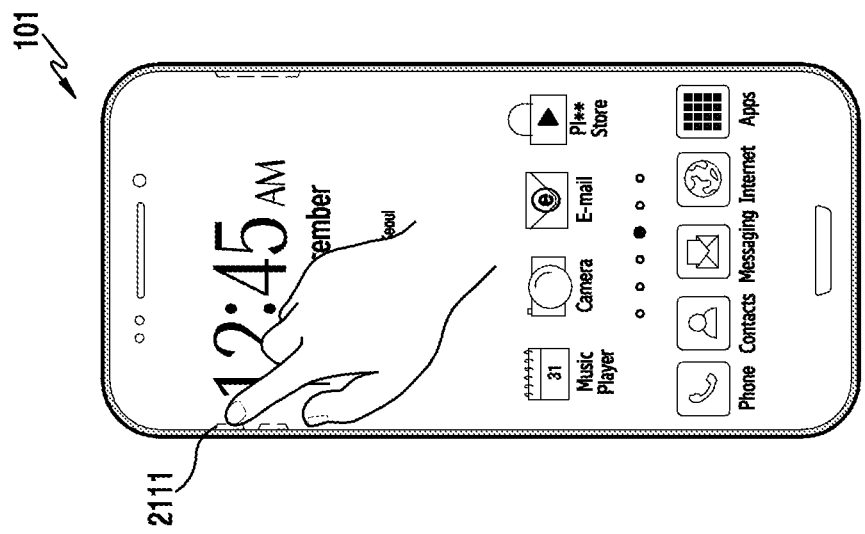

FIGS. 21A to 21B are example views of a screen showing an operating method of an electronic device, according to another embodiment of the present disclosure.

According to various embodiments, as shown in FIGS. 21A to 21B, if a touch occurs in the electronic device 101, the processor 210 can identify whether or not the display 160 is activated. The processor 210 can identify that the display 160 is in the activated state and the touch occurrence position corresponds to a key 2111 that is positioned on the lateral side of the electronic device 101 as shown in FIG. 21A. For example, the key 2111 (hereinafter, referred to as an up-key 2111) on the lateral side of the electronic device 101 can be intended to increase the volume of the ring tone or the like of the electronic device 101. The up-key 2111 can be provided as a soft key that is embedded on the lateral side of the electronic device 101, and can be provided in the form of a hard key that protrudes from the lateral side of the electronic device 101. The processor 210, as shown in FIG. 21B, can display, on the display 160, a screen that shows the currently set volume of the ring tone of the electronic device 101 and is related to the up-key 2111 (for example, a control screen 2113 for controlling the volume). The control screen 2113 can be displayed in the position close to the up-key 2111. According to the embodiment, when a touch occurs on the control screen 2113, the processor 210 can increase the volume of the ring tone based on the occurred touch. According to the embodiment, when a touch is consistently repeated in the position of the up-key 2111, the processor 210 can consistently increase the volume of the ring tone based on the touch.

According to various embodiments, when a touch occurs in the electronic device 101, the processor 210 can identify the position in which the touch has occurred and a pressure change at the touch occurrence time. The processor 210 can identify that the touch occurrence position corresponds to the up-key 2111 provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can display, on the display 160, the control screen 2113 that shows the currently set volume of the ring tone and that can control the ring tone. If the identified pressure change is equal to, or more than, a threshold value, the processor 210 can increase the currently set volume of the ring tone. For example, when the pressure change gradually increases in the position of the up-key 2111, the processor 210 can gradually increase the volume of the ring tone.

FIGS. 22A to 22B are example views of a screen showing an operating method of an electronic device, according to another embodiment of the present disclosure.

According to various embodiments, as shown in FIGS. 22A to 22B, if a touch occurs in the electronic device 101, the processor 210 can identify whether or not the display 160 is activated. The processor 210 can identify that the display 160 is in the activated state and the touch occurrence position corresponds to a key 2211 that is positioned on the lateral side of the electronic device 101 as shown in FIG. 22A. For example, the key 2211 (hereinafter, referred to as a down-key 2211) on the lateral side of the electronic device 101 can be intended to reduce the volume of the ring tone or the like of the electronic device 101. The down-key 2211 can be provided as a soft key that is embedded on the lateral side of the electronic device 101, and can be provided in the form of a hard key that protrudes from the lateral side of the electronic device 101. The processor 210, as shown in FIG. 22B, can display, on the display 160, a screen that shows the currently set volume of the ring tone of the electronic device 101 and is related to the down-key 2211 (for example, a control screen 2213 for controlling the volume). The control screen 2213 can be displayed in the position close to the down-key 2211. According to the embodiment, when a touch occurs on the control screen 2213, the processor 210 can reduce the volume of the ring tone based on the occurred touch. According to the embodiment, when a touch is consistently repeated in the position of the down-key 2211, the processor 210 can consistently reduce the volume of the ring tone based on the touch.

According to various embodiments, when a touch occurs in the electronic device 101, the processor 210 can identify the position in which the touch has occurred and a pressure change at the touch occurrence time. The processor 210 can identify that the touch occurrence position corresponds to the down-key 2211 provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can display, on the display 160, the control screen 2213 that shows the currently set volume of the ring tone and that can control the ring tone. If the identified pressure change is equal to, or more than, a threshold value, the processor 210 can reduce the currently set volume of the ring tone. For example, when the pressure change gradually increases in the position of the down-key 2211, the processor 210 can gradually reduce the volume of the ring tone.

Figure 23:
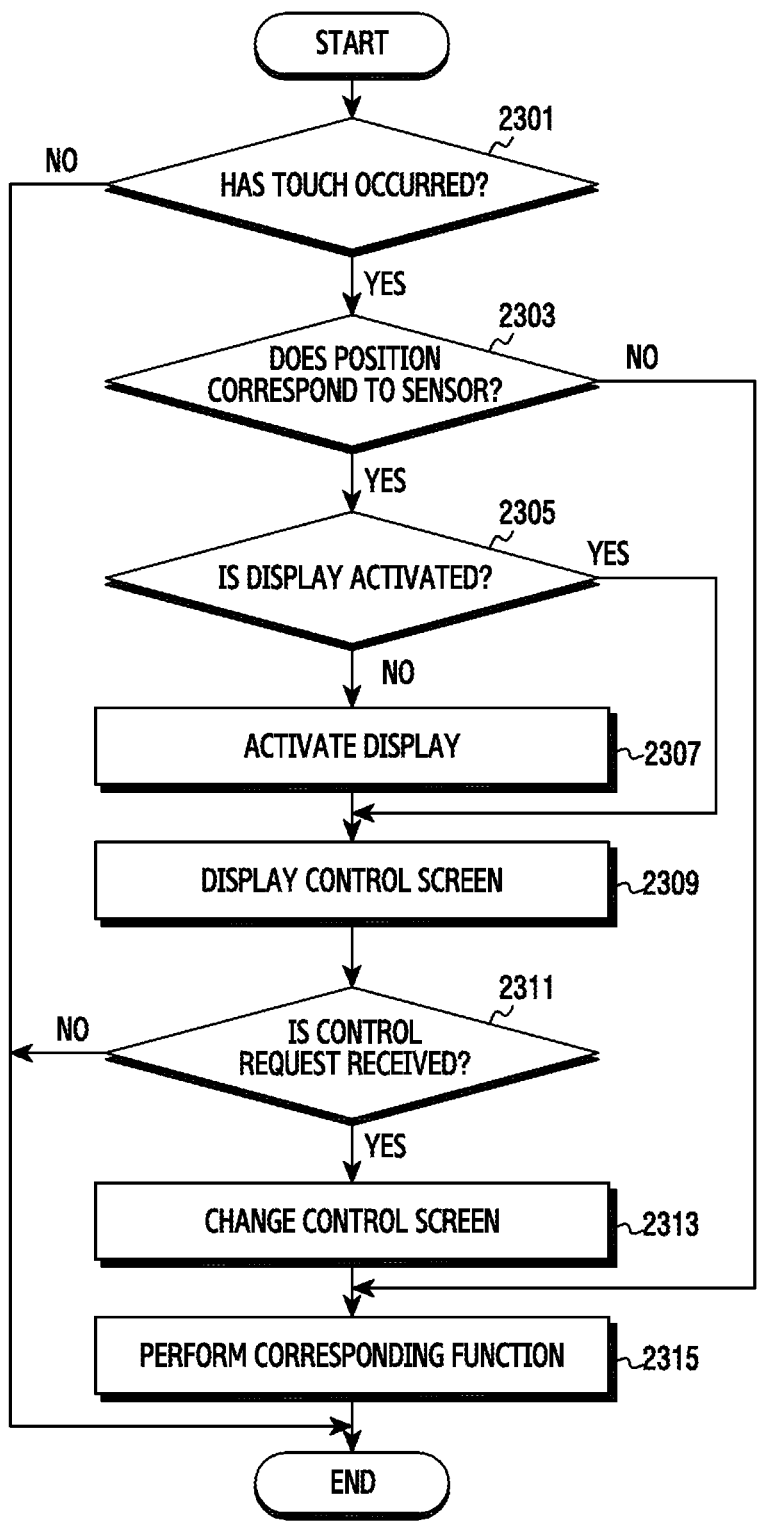
FIG. 23 is a flowchart to explain an operating method of an electronic device, according to an embodiment of the present disclosure.

FIG. 23 is a flowchart to explain an operating method of an electronic device, according to an embodiment of the present disclosure.

As shown in FIG. 23, the processor 210 can identify whether or not a touch occurs in operation 2301. If a touch occurs in operation 2301, the processor 210 can perform operation 2303, and if no touch occurs in operation 2301, the processor 210 can terminate the corresponding process. In operation 2303, the processor 210 can identify whether or not the position in which the touch has occurred corresponds to a physically equipped sensor that is provided in the electronic device 101. If the position in which the touch has occurred corresponds to a specific sensor as a result of the identification in operation 2303, the processor 210 can perform operation 2305. If the position in which the touch has occurred does not correspond to a specific sensor as a result of the identification in operation 2303, the processor 210 can perform operation 2315. In operation 2315, the processor 210 can perform the corresponding function. According to the embodiment, the processor 210 can perform the corresponding function (for example, the execution of an icon that is placed in the position in which the touch has occurred) in operation 2315.

In operation 2305, the processor 210 can identify whether or not the display 160 is in the activated state. If the display 160 is not in the activated state as a result of the identification in operation 2305, the processor 210 can perform operation 2307. If the display 160 is in the activated state as a result of the identification in operation 2305, the processor 210 can perform operation 2309. In operation 2309, the processor 210 can display, on the display 160, a screen that is related to a specific sensor. In operation 2307, the processor 210 can activate the inactivated display 160, and can perform operation 2309. In operation 2309, the processor 210 can display a screen on the activated display 160. The screen can be a screen that shows the current state of the sensor and is related to the sensor (for example, a control screen for controlling the sensor).

If a control request for the specific sensor is received through the control screen displayed on the display 160 in operation 2311, the processor 210 can perform operation 2313. If a control request for the specific sensor is not received in operation 2311, the processor 210 can terminate the corresponding process. In operation 2313, the processor 210 can update and display the control screen that is displayed in operation 2309 according to the received control request, and then the processor 210 can perform operation 2315. The processor 210 can perform the corresponding function in operation 2315. In operation 2315, the processor 210 can control the specific sensor according to the control request that is received in operation 2311.

Figure 24C:
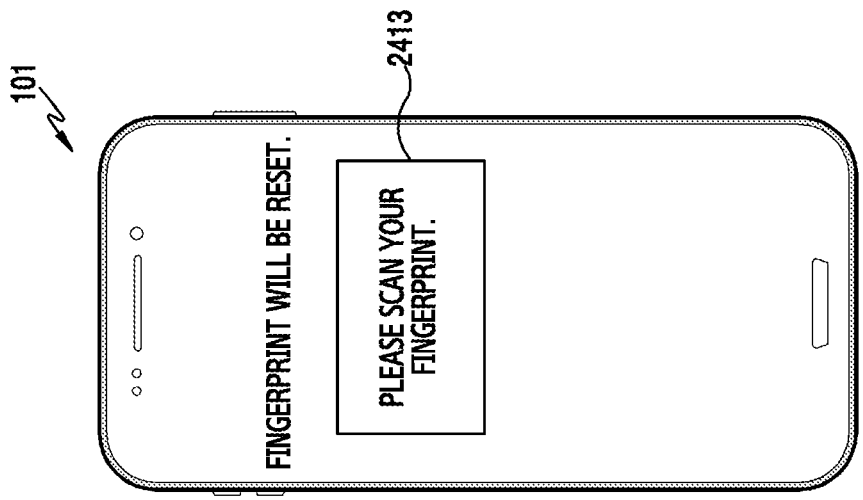
FIGS. 24A to 24C are example views of a screen showing an operating method of an electronic device, according to an embodiment of the present disclosure.
Figure 24B:
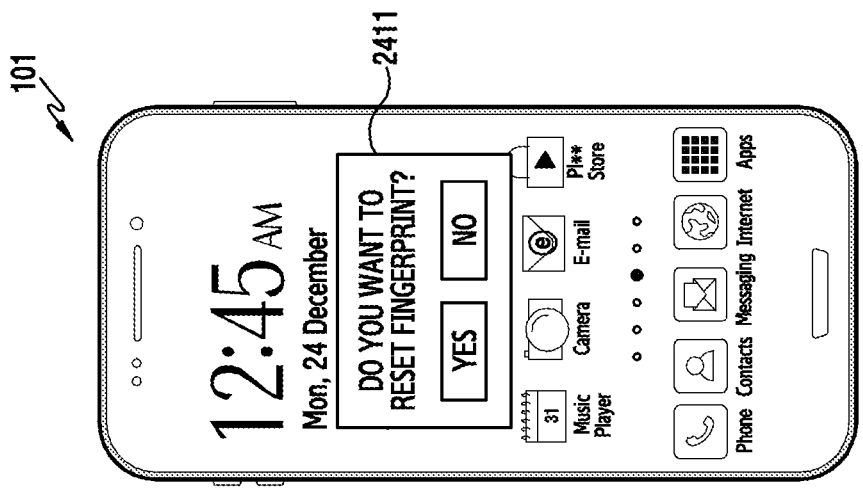
Figure 24A:
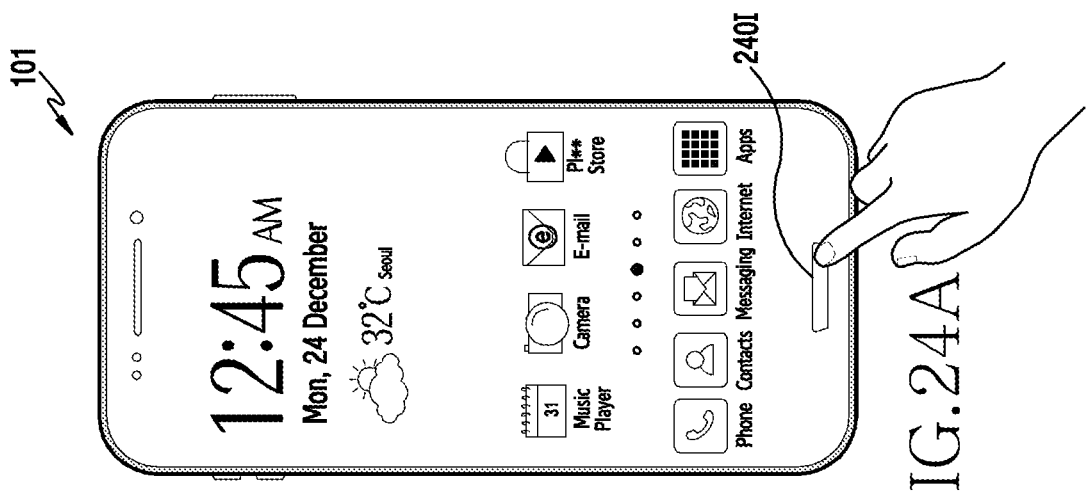

FIGS. 24A to 24C are example views of a screen showing an operating method of an electronic device, according to an embodiment of the present disclosure.

According to various embodiments, as shown in FIGS. 24A to 24C, if a touch occurs in the electronic device 101, the processor 210 can identify whether or not the display 160 is activated. The processor 210 can identify that the display 160 is in the activated state and the touch occurrence position corresponds to a fingerprint sensor 240I (for example, the fingerprint sensor can be the biometric sensor 240I shown in FIG. 2) that is provided in the electronic device 101 as shown in FIG. 24A. The processor 210 can identify the central point of the area in which the touch is detected. The processor 210 can more accurately identify the position in which the touch has occurred based on the identified central point.

The processor 210 can display the first control screen 2411 on the display 160, as shown in FIG. 24B. For example, the first control screen 2411 can be intended to confirm whether or not to reset a fingerprint that is registered by using the fingerprint sensor 240I. When a control request is received (for example, YES is selected in the control screen 2411), the processor 210 can display, on the display 160, the second control screen 2413 for resetting the fingerprint as shown in FIG. 24C. The processor 210 can activate the fingerprint sensor 240I while displaying the second control screen 2413 on the display 160. The second control screen 2413 can be an updated screen from the first control screen 2411 according to the control request. The processor 210 can reset the registered fingerprint by using fingerprint data that is detected by the fingerprint sensor 240I. According to an embodiment, if a touch occurs in the position of the fingerprint sensor 240I while the display 160 is not activated, the processor 210 can activate the display 160, and can display the first control screen 2411 shown in FIG. 24B on the display 160.

According to various embodiments, when a touch occurs in the electronic device 101, the processor 210 can identify the position in which the touch has occurred and a pressure change at the touch occurrence time. The processor 210 can identify that the touch occurrence position corresponds to the fingerprint sensor 240I provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can display the first control screen 2411 on the display 160. If the identified pressure change is equal to, or more than, a threshold value, the processor 210 can display the second control screen 2413 on the display 160. The processor 210 can activate the fingerprint sensor 240I while displaying the second control screen 2413 on the display 160.

Figure 25A:
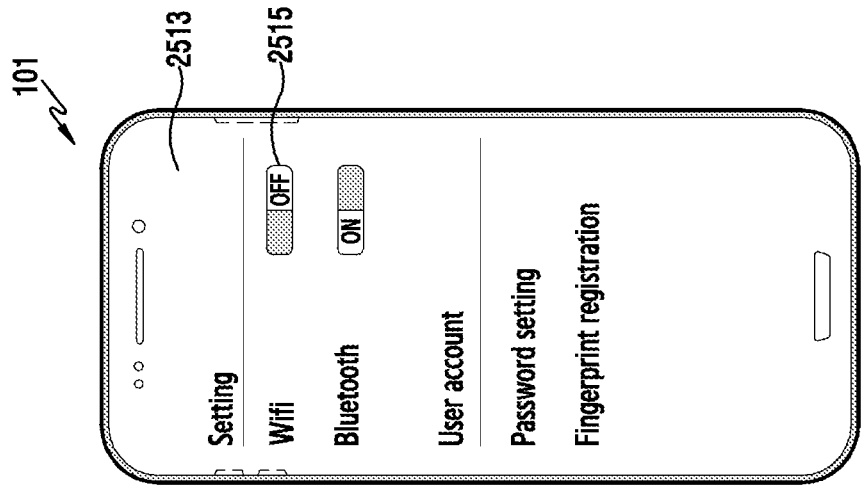
FIGS. 25A to 25C are example views of a screen showing an operating method of an electronic device, according to another embodiment of the present disclosure.
Figure 25B:
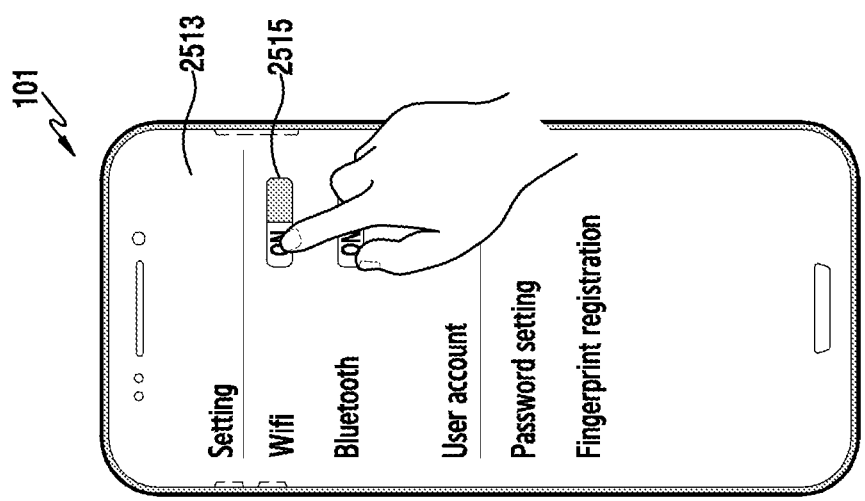
Figure 25C:
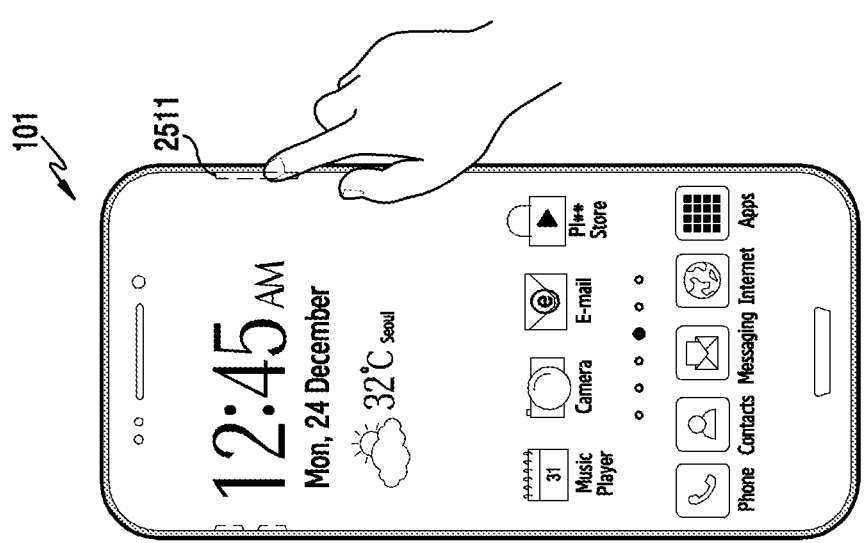

FIGS. 25A to 25C are example view of a screen showing an operating method of an electronic device, according to another embodiment of the present disclosure.

According to various embodiments, as shown in FIGS. 25A to 25C, if a touch occurs in the electronic device 101, the processor 210 can identify whether or not the display 160 is activated. The processor 210 can identify that the display 160 is in the activated state and the touch occurrence position corresponds to a key 2511 that is positioned on the side of the electronic device 101 as shown in FIG. 25A. For example, the key 2511 (hereinafter, referred to as a power-key 2511) on the lateral side of the electronic device 101 can be intended to turn on/off the electronic device 101. The power-key 2511 can be provided as a soft key that is embedded on the lateral side of the electronic device 101, and can be provided in the form of a hard key that protrudes from the lateral side of the electronic device 101. The processor 210 can display a control screen 2513 on the display 160 as shown in FIG. 25B. For example, the control screen 2513 can be a screen for controlling the overall settings of functions of the electronic device 101 (such as the activation of WiFi®, the activation of Bluetooth, the setting of a password, the registration of a fingerprint, or the like).

When a control request for a specific function setting is received in the control screen 2513, the processor 210 can update the control screen 2513 to then be displayed on the display 160. If WiFi is in the activated state, the processor 210 can allow an icon 2515, which indicates whether or not WiFi is activated, to be displayed to indicate the on state on the control screen 2513. When a control request for inactivating WiFi is received, the processor 210 can allow an icon 2515, which indicates whether or not WiFi is activated, to be changed into the off state and to then be displayed as shown in FIG. 25C. The processor 210 can inactivate WiFi according to a control request.

According to various embodiments, when a touch occurs in the electronic device 101, the processor 210 can identify the position in which the touch has occurred and a pressure change at the touch occurrence time. The processor 210 can identify that the touch occurrence position corresponds to the power key 2511 provided in the electronic device 101. The processor 210 can identify the central point of the area in which the touch is detected. The processor 210 can identify the position in which the touch has occurred based on the identified central point and based on the position where the pressure change is the maximum. If the identified pressure change is less than a threshold value, the processor 210 can display the control screen 2513 on the display 160. If the identified pressure change is equal to, or more than, a threshold value, the processor 210 can turn off the display 160.

According to an embodiment, an operating method of an electronic device can include: identifying a sensor corresponding to an area where a touch is detected among at least one sensor included in the electronic device; displaying a user interface to control a function corresponding to the identified sensor; and controlling the function corresponding to the identified sensor.

The operation of identifying the sensor can further include: identifying a central point of the area where the touch is detected; identifying a position of the touch based on the central point; and identifying a sensor corresponding to the position of the touch.

The at least one sensor can include at least one of a proximity sensor, an illuminance sensor, a camera, a biometric sensor, a receiver, a temperature sensor, a humidity sensor, an ultraviolet sensor, or soft keys.

The operation of controlling the function can include converting, based on the touch, the sensor into one of either an activated state or an inactivated state, which is the function corresponding to the identified sensor.

The operation of controlling the function can include controlling, based on the touch, one of either the display brightness or the sound volume, which is a function corresponding to the identified sensor.

The operation of identifying the sensor can include: identifying a pressure change in the area where the touch is detected; identifying a position of the touch based on the pressure change; and identifying a sensor corresponding to the position of the touch.

The operation of controlling the function can include converting, based on the pressure change, the sensor into one of either an activated state or an inactivated state, which is a function corresponding to the sensor.

The operation of controlling at least one sensor can include controlling, based on the pressure change, one of either a display brightness or a sound volume, which is the function corresponding to the identified sensor.

The method can further include updating the displayed user interface according to a control request.

The method can further include: controlling the function; and updating the displayed user interface according to the control.

Meanwhile, the embodiments of the present disclosure disclosed in the present specification and the drawings have been presented to easily explain technical contents of the present disclosure and help comprehension of the present disclosure, and do not limit the scope of the present disclosure. Although the present disclosure has been described with an example embodiment, various changes and modifications can be suggested to one skilled in the art. It is intended that the present disclosure encompass such changes and modifications as fall within the scope of the appended claims.

What is claimed is:

1. An electronic device comprising:
   at least one sensor;
   a display;
   a touch panel configured to be disposed to detect a position on the display where a touch occurs; and
   a processor configured to:
   map each of the at least one sensor and each of coordinate values on a display corresponding to a position of the at least one sensor wherein the at least one sensor is disposed below the display,
   identify a coordinate value on the display corresponding to a position where a touch is detected on the touch panel,
   identify a sensor disposed below a position on the display corresponding to the identified coordinate value among the at least one sensor based on the mapping,
   in case that the display is in an activated state, control the display to display a control screen to control a function corresponding to the identified sensor and control the function, and
   in case that the display is in an inactivated state, control the display to display a screen that is related to the function corresponding to the identified sensor.

2. The electronic device according to claim 1, wherein the processor is configured to:
   identify a coordinate value of a central point of the position where the touch is detected;
   identify a position of the touch based on the coordinate value; and
   identify a sensor corresponding to the position of the touch.

3. The electronic device according to claim 1, wherein the at least one sensor comprises at least one of a proximity sensor, an illuminance sensor, a camera, a biometric sensor, a receiver, a temperature sensor, a humidity sensor, an ultraviolet sensor, or soft keys.

4. The electronic device according to claim 1, wherein the processor is configured to convert, based on the touch, the identified sensor into one of either an activated state or an inactivated state, which is the function corresponding to the identified sensor.

5. The electronic device according to claim 1, wherein the processor is configured to control, based on the touch, one of either a display brightness or a sound volume, which is the function corresponding to the identified sensor.

6. The electronic device according to claim 1, further comprising a pressure sensor, wherein the processor is configured to:
   identify a pressure change in the position where the touch is detected;
   identify a coordinate value of the touch based on the pressure change; and
   identify a sensor corresponding to the coordinate value of the touch.

7. The electronic device according to claim 6, wherein the processor is configured to convert, based on the pressure change, the identified sensor into one of either an activated state or an inactivated state, which is a function corresponding to the identified sensor.

8. The electronic device according to claim 6, wherein the processor is configured to control, based on the pressure change, one of either a display brightness or a sound volume, which is the function corresponding to the identified sensor.

9. The electronic device according to claim 1, wherein the processor is configured to update the displayed control screen according to a control request.

10. The electronic device according to claim 1, wherein the processor is configured to update the displayed control screen according to a function control.

11. An operating method of an electronic device comprising a touch panel and at least one sensor, the method comprising:
    mapping each of the at least one sensor and each of coordinate values on a display corresponding to a position of the at least one sensor wherein the at least one sensor is disposed below the display;
    identifying a coordinate value on the display corresponding to an area on the display where a touch is detected on the touch panel;
    identifying a sensor disposed below a position on the display corresponding to the identified coordinate value among the at least one sensor based on the mapping;
    in case that the display is in an activated state, displaying a control screen to control a function corresponding to the identified sensor and control the function corresponding to the identified sensor; and
    in case that the display is in an inactivated state, displaying a screen that is related to the function corresponding to the identified sensor,
    wherein the touch panel is disposed to detect a position on the display where the touch occurs.

12. The method according to claim 11, wherein the identifying of the sensor comprises:
    identifying a coordinate value of a central point of the area where the touch is detected;
    identifying a position of the touch based on the coordinate value; and
    identifying a sensor corresponding to the position of the touch.

13. The method according to claim 11, wherein the at least one sensor comprises at least one of a proximity sensor, an illuminance sensor, a camera, a biometric sensor, a receiver, a temperature sensor, a humidity sensor, an ultraviolet sensor, or soft keys.

14. The method according to claim 11, wherein the controlling of the function comprises converting, based on the touch, the identified sensor into one of either an activated state or an inactivated state, which is the function corresponding to the identified sensor.

15. The method according to claim 11, wherein the controlling of the function comprises controlling, based on the touch, one of either a display brightness or a sound volume, which is a function corresponding to the identified sensor.

16. The method according to claim 11, wherein the identifying of the sensor further comprises:
    identifying a pressure change in the area where the touch is detected;
    identifying a coordinate value of the touch based on the pressure change; and
    identifying a sensor corresponding to the coordinate value of the touch.

17. The method according to claim 16, wherein the controlling of the function comprises converting, based on the pressure change, the identified sensor into one of either an activated state or an inactivated state, which is a function corresponding to the identified sensor.

18. The electronic device to claim 1, wherein the touch panel is disposed above the display.

19. The method according to claim 11, wherein mapping each of the at least one sensor and each of the coordinate values on the display comprises mapping coordinate values respect to an area in a threshold distance based on each of the coordinate values.

20. The electronic device to claim 1, wherein the touch does not comprise a touch contacting with the at least one sensor.

* * * * *